United States Patent
Chen

(10) Patent No.: US 12,282,866 B2
(45) Date of Patent: Apr. 22, 2025

(54) MULTI-TARGET TRACKING WITH DEPENDENT LIKELIHOOD STRUCTURES

(71) Applicant: MOTIONAL AD LLC, Boston, MA (US)

(72) Inventor: Lingji Chen, Boston, MA (US)

(73) Assignee: MOTIONAL AD LLC, Boston, MA (US)

( * ) Notice: Subject to any disclaimer, the term of this patent is extended or adjusted under 35 U.S.C. 154(b) by 1009 days.

(21) Appl. No.: 17/324,960

(22) Filed: May 19, 2021

(65) Prior Publication Data

US 2022/0374734 A1 Nov. 24, 2022

(51) Int. Cl.
| | |
|---|---|
| *G06V 20/58* | (2022.01) |
| *G05D 1/00* | (2006.01) |
| *G06F 18/21* | (2023.01) |
| *G06F 18/2113* | (2023.01) |
| *G06N 5/04* | (2023.01) |

(52) U.S. Cl.
CPC .............. *G06N 5/04* (2013.01); *G05D 1/0214* (2013.01); *G05D 1/0221* (2013.01); *G06F 18/2113* (2023.01); *G06F 18/217* (2023.01); *G06V 20/58* (2022.01); *G06V 2201/07* (2022.01)

(58) Field of Classification Search
CPC ...... G06V 20/58; G06F 18/217; G06F 1/2113
See application file for complete search history.

(56) References Cited

U.S. PATENT DOCUMENTS

2021/0293976 A1   9/2021   Bonnifait et al.

OTHER PUBLICATIONS

Chen, "From labels to tracks: It's complicated," *Proc. SPIE* 10646, Signal Processing, Sensor/Information Fusion, and Target Recognition XXVII, 1064603, 2018, https://doi.org/10.1117/12.2304487, 6 pages.
Chen, "A Merge/Split Algorithm for Multitarget Tracking Using Generalized Labeled Multi-Bernoulli Filters," arXiv:1908.01743v2, 2020, 10 pages.
Chen, "An Introduction to the Generalized Labeled Multi-Bernoulli Filter through Matlab Code," *Signal Processing, Sensor/Information Fusion, and Target Recognition* XXVII, 2018, 11 pages.

(Continued)

*Primary Examiner* — Sam Bhattacharya
(74) *Attorney, Agent, or Firm* — Knobbe, Martens, Olson & Bear, LLP

(57) ABSTRACT

The present disclosure includes systems, methods, and computer-readable storage media facilitating multi-target tracking with dependent likelihood structures. To facilitate tracking, sensor data associated with an environment that a vehicle is located in may be received. A set of candidate hypotheses may be obtained based on the sensor data. Each candidate hypothesis in the set of candidate hypotheses may include track and measurement information representative of candidate locations for one or more targets. The set of candidate hypotheses are evaluated against at least one criterion. A ranked set of hypotheses are determined based on the evaluation of the set of candidate hypothesis against the at least one criterion. The ranked set of hypotheses may include a subset of hypotheses selected from among the set of candidate hypotheses and may be used to estimate a location of each of the one or more targets.

20 Claims, 17 Drawing Sheets

(56) References Cited

OTHER PUBLICATIONS

Chong et al., "Forty Years of Multiple Hypothesis Tracking—A Review of Key Developments," 2018 21st *International Conference on Information Fusion*, pp. 452-459.
Garcia-Fernandez et al., "Multiple Target Tracking Based on Sets of Trajectories," *IEEE Transactions on Aerospace and Electronic Systems*, 2020, vol. 56, No. 3, pp. 1685-1707.
Granström et al., "Extended Object Tracking: Introduction, Overview, and Applications," *Journal of Advances in Information Fusion*, 2017, vol. 12, No. 2, pp. 139-174.
Li et al. "Multiobject Tracking for Generic Observation Model Using Labeled Random Finite Sets," *IEEE Transactions on Signal Processing*, 2018, vol. 66, No. 2, pp. 368-383.
Lu et al., "Evaluation of Optimizations of Murty's M-Best Assignment," SPIE 2018, vol. 10646, 106460B, 7 pages.
Morefield, "Application of 0-1 Integer Programming to Multitarget Tracking Problems," *IEEE Transactions on Automatic Control*, 1977, pp. 302-312.
Munkres, "Algorithms For The Assignment And Transportation Problems," *J. Soc. Indust. Appl. Math.*, 1957, vol. 5, No. 1, pp. 32-38.
Murty, "An Algorithm for Ranking all the Assignments in Order of Increasing Cost," University of California, Berkeley, California 1967, pp. 682-687.
Papi et al., "Generalized Labeled Multi-Bernoulli Approximation of Multi-Object Densities," *IEEE Transactions on Signal Processing*, 2015, vol. 63, No. 20, pp. 5487-5497.
Reid, "An Algorithm for Tracking Multiple Targets," *IEEE Transactions on Automatic Control*, 1979, vol. AC-24, No. 6, pp. 843-854.
Vo et al., "An Efficient Implementation of the Generalized Labeled Multi-Bernoulli Filter," *IEEE Transactions on Signal Processing*, 2017, vol. 65, No. 8, pp. 1975-1987.
Vo et al., "Joint Detection and Estimation of Multiple Objects From Image Observations," *IEEE Transactions on Signal Processing*, 2010, vol. 58, No. 10, pp. 5129-5141.
Vo et al., "Labeled Random Finite Sets and the Bayes Multi-Target Tracking Filter," *IEEE Transactions on Signal Processing*, 2014, vol. 62, No. 24, pp. 6554-6567.
Vo et al., "Multitarget Tracking," *Wiley Encyclopedia of Electrical and Electronics Engineering*, 2015, pp. 1-23.
Definition of "Metric", Merriam-Webster.com, in 5 pages. URL: https://www.merriam-webster.com/dictionary/metric.
SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
Great Britain Office Action Issued for Application No. GB 2117356.2, dated Dec. 6, 2021.
Great Britain Office Action issued for Application No. GB 2117356.2, dated Aug. 1, 2022.
Korean Office Action issued for Application No. KR 10-2021-0191649, dated Jul. 26, 2024.

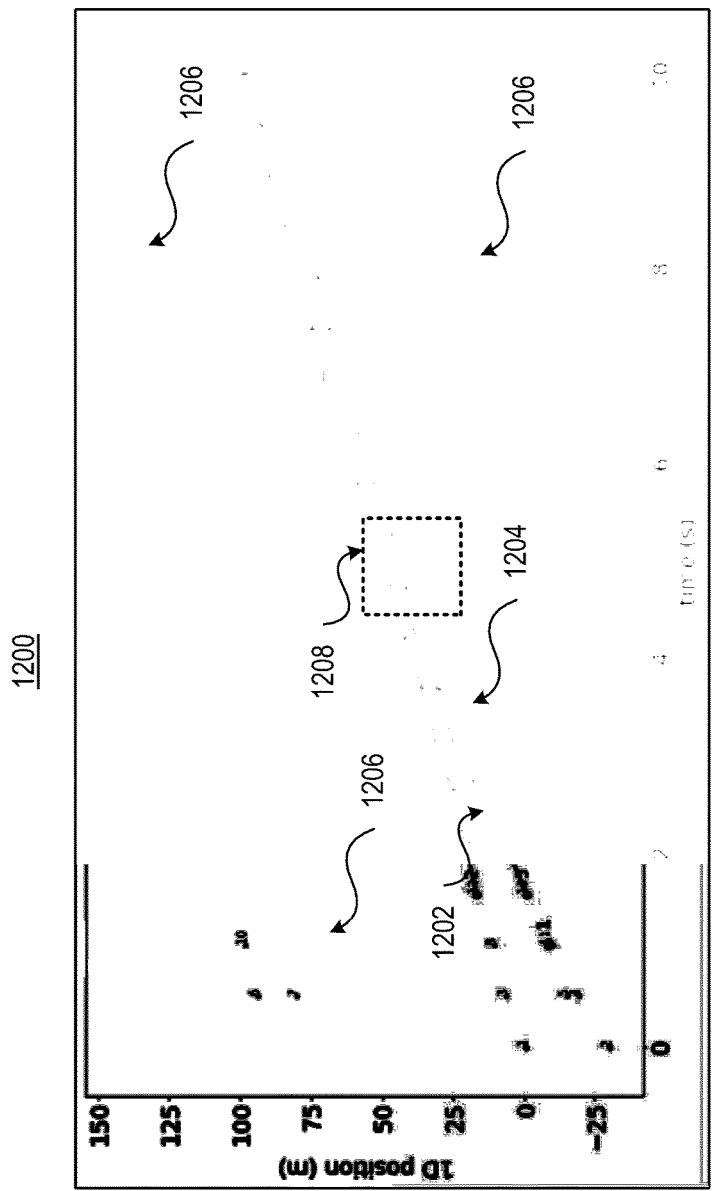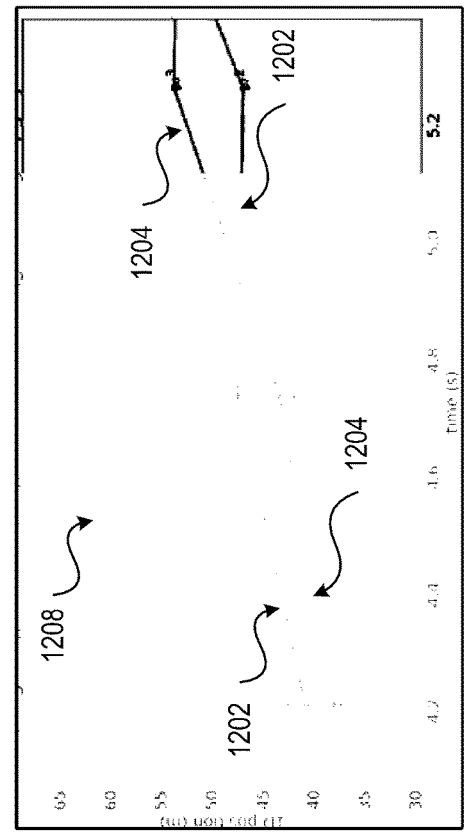
FIG. 12A
FIG. 12B

MULTI-TARGET TRACKING WITH DEPENDENT LIKELIHOOD STRUCTURES

BACKGROUND

Tracking of targets plays an important role in many different technologies. For example, tracking may be used by an autonomous vehicle to track other vehicles and use the information about the tracked vehicles to make navigation decisions. Due to computational resource limitations, current tracking techniques often assume that an individual target-measurement association likelihood is independent of others (e.g., it remains the same in whichever hypothesis it belongs to). However, there are situations where the independence assumption does not hold and those situations may degrade the accuracy of the tracking.

BRIEF DESCRIPTION OF THE DRAWINGS

FIGS. 12A-12B is a plot illustrating tracking based on an independence assumption.

DETAILED DESCRIPTION

Figure 1:
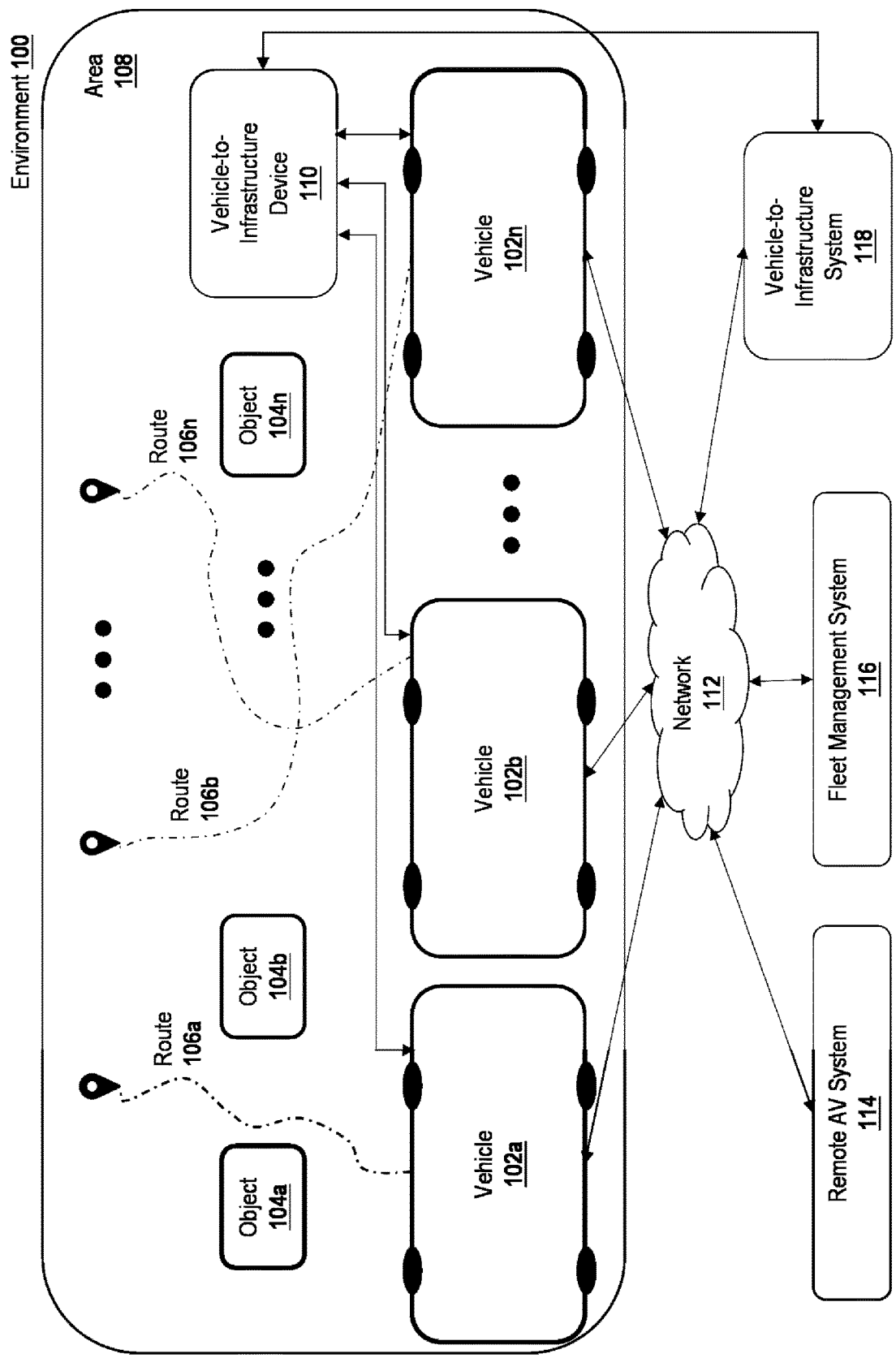
FIG. 1 is an example environment in which a vehicle including one or more components of an autonomous system in accordance with aspects of the present disclosure can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Some embodiments of the present disclosure are described herein in connection with a threshold. As described herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a process for performing multi-target tracking with dependent likelihood structures. An exemplary method according to the present disclosure includes receiving, with at least one processor, sensor data associated with an environment that a vehicle is located in. The method also includes obtaining, with the at least one processor, a set of candidate hypotheses based on the sensor data. Each candidate hypothesis in the set of candidate hypotheses may include track and measurement information representative of locations of one or more targets. The method additionally includes evaluating, with the at least one processor, the set of candidate hypotheses against at least one criterion, and determining, with the at least one processor, a ranked set of hypotheses based on the evaluation of the set of candidate hypothesis against the at least one criterion. The ranked set of hypotheses may include a subset of hypotheses selected from among the set of candidate hypotheses based on the at least one criterion. The method also includes estimating, with the at least one processor, a location of each of the one or more targets based on the ranked set of hypotheses.

A system in accordance with the present disclosure may include at least one processor, and at least one non-transitory storage media storing instructions that, when executed by the at least one processor, cause the at least one processor to perform operations for multi-target tracking with dependent likelihood structures. For example, the at least one processor may receive sensor data associated with an environment that a vehicle is located in, and obtain a set of candidate hypotheses based on the sensor data. Each candidate hypothesis in the set of candidate hypotheses may include track and measurement information representative of locations of one or more targets. The at least one processor may also evaluate the set of candidate hypotheses against at least one criterion and determine a ranked set of hypotheses based on the evaluation of the set of candidate hypothesis against the at least one criterion. The ranked set of hypotheses comprises a subset of hypotheses selected from among the set of candidate hypotheses based on the at least one criterion. The at least one processor may also estimate a location of each of the one or more targets based on the ranked set of hypotheses.

At least one non-transitory computer-readable storage medium storing instructions that, when executed by one or more processors, cause the one or more processors to perform operations for multi-target tracking with dependent likelihood structures is also disclosed. The operations include receiving sensor data associated with an environment that a vehicle is located in, and obtaining a set of candidate hypotheses based on the sensor data. Each candidate hypothesis in the set of candidate hypotheses may include track and measurement information representative of a candidate location of one or more targets. The operations also include evaluating the set of candidate hypotheses against at least one criterion, and determining a ranked set of hypotheses based on the evaluation of the set of candidate hypothesis against the at least one criterion. The ranked set of hypotheses may include a subset of hypotheses selected from among the set of candidate hypotheses based on the at least one criterion. The operations also include estimating a location of each of the one or more targets based on the ranked set of hypotheses.

By virtue of the implementation of systems, methods, and computer program products described herein, techniques for multi-target tracking with dependent likelihood structures in accordance with the present disclosure efficiently reduce the number of hypotheses over which targets are tracked, thereby reducing the computational complexity of the tracking system (e.g., less computing resources are needed to perform tracking). It is noted that despite utilizing a reduced number of hypotheses, the disclosed tracking techniques provide for rapid identification of instances of collision and occlusion conditions, which improves tracking accuracy. Moreover, due to the high levels of accuracy and reduced computational complexities, the disclosed tracking techniques may also enable more targets to be tracked simultaneously.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
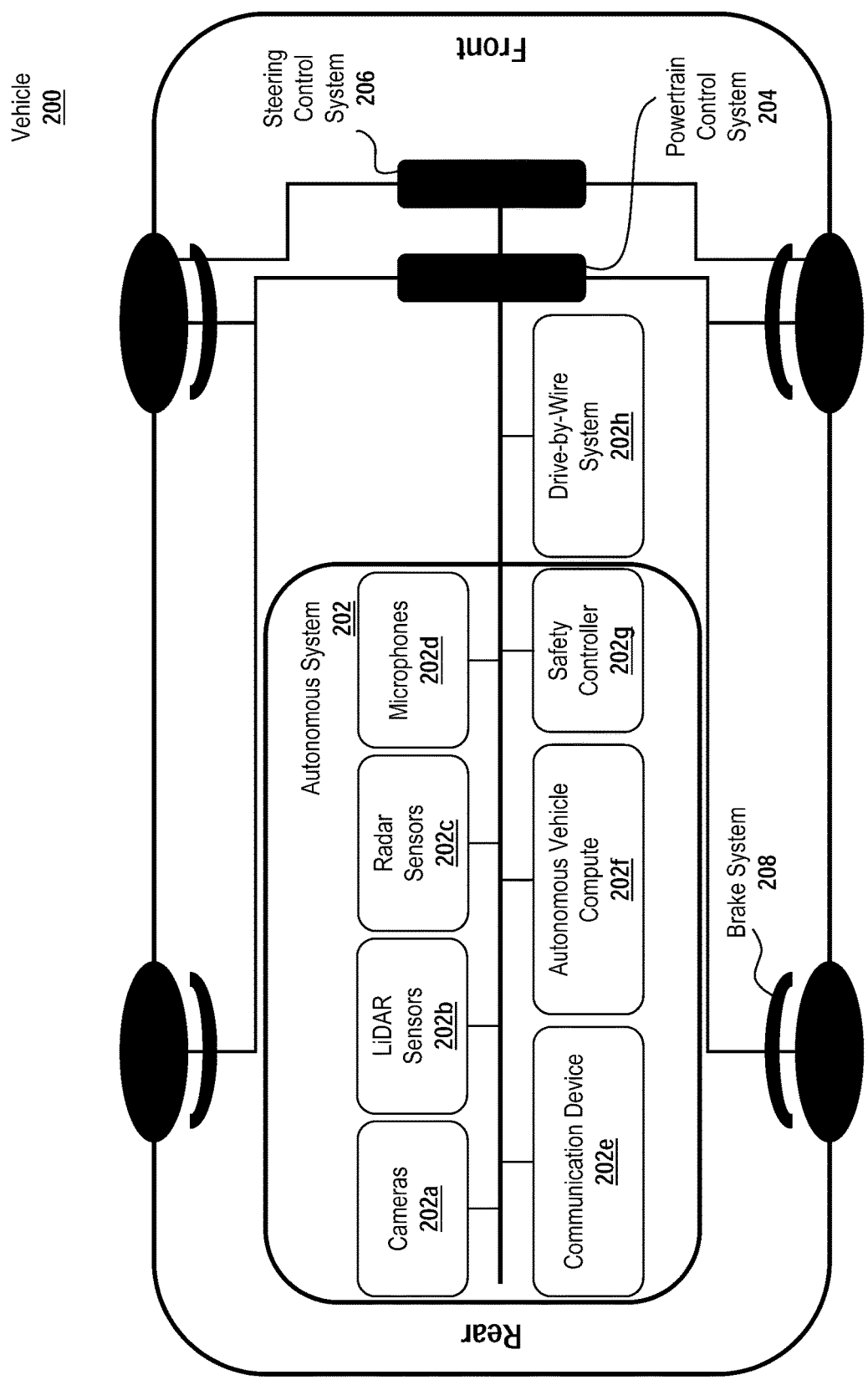
FIG. 2 is a diagram of one or more systems of a vehicle including an autonomous system according to aspects of the present disclosure.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
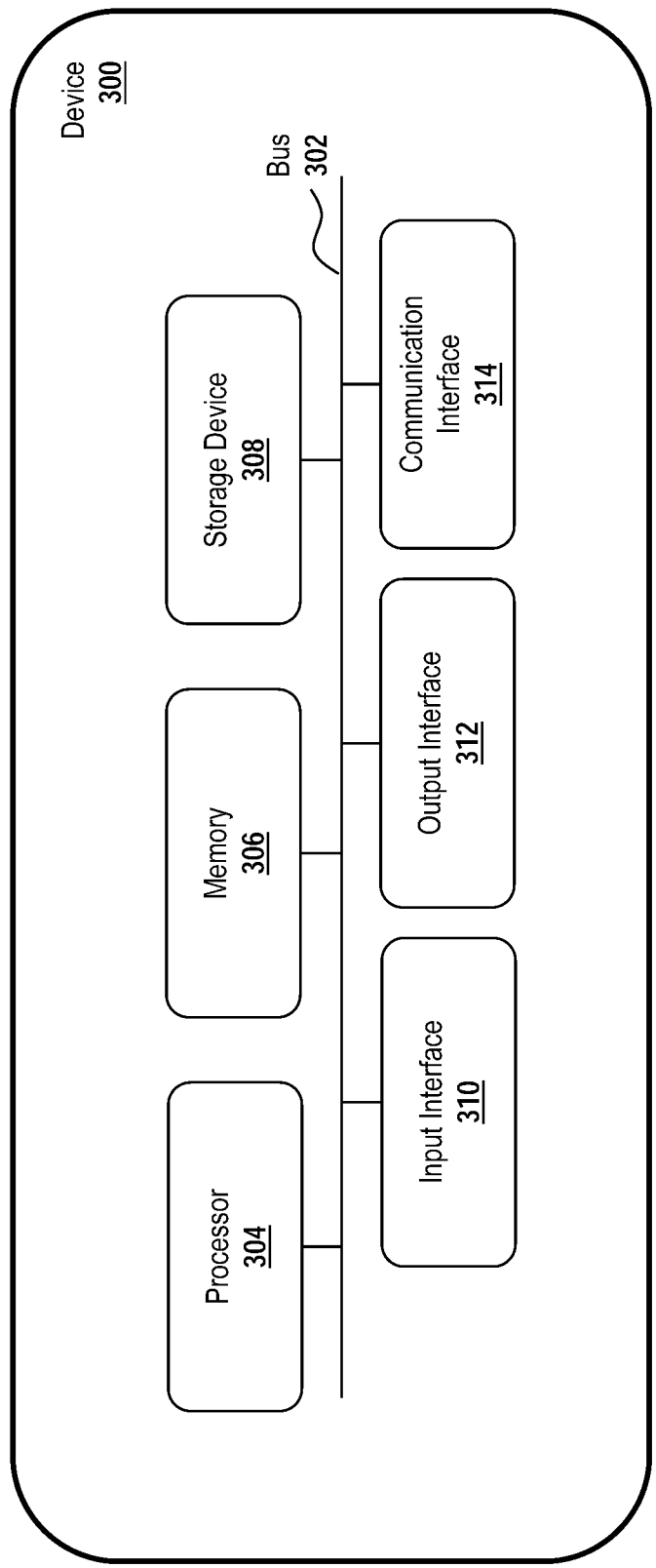
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of vehicle 200 (e.g., at least one device of a system of vehicle 202), at least one device of vehicles 510, 520, 530 (e.g., at least one device of a system of any of vehicles 510, 520, 530), and/or one or more devices of network 112 (e.g., one or more devices of a system of network 112). In some embodiments, one or more devices of vehicles 102 (e.g., one or more devices of a system of vehicles 102), one or more devices of vehicles 202 (e.g., one or more devices of a system of vehicles 202), one or more devices of vehicles 510, 520, 530 (e.g., at least one device of a system of any of vehicles 510, 520, 530), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
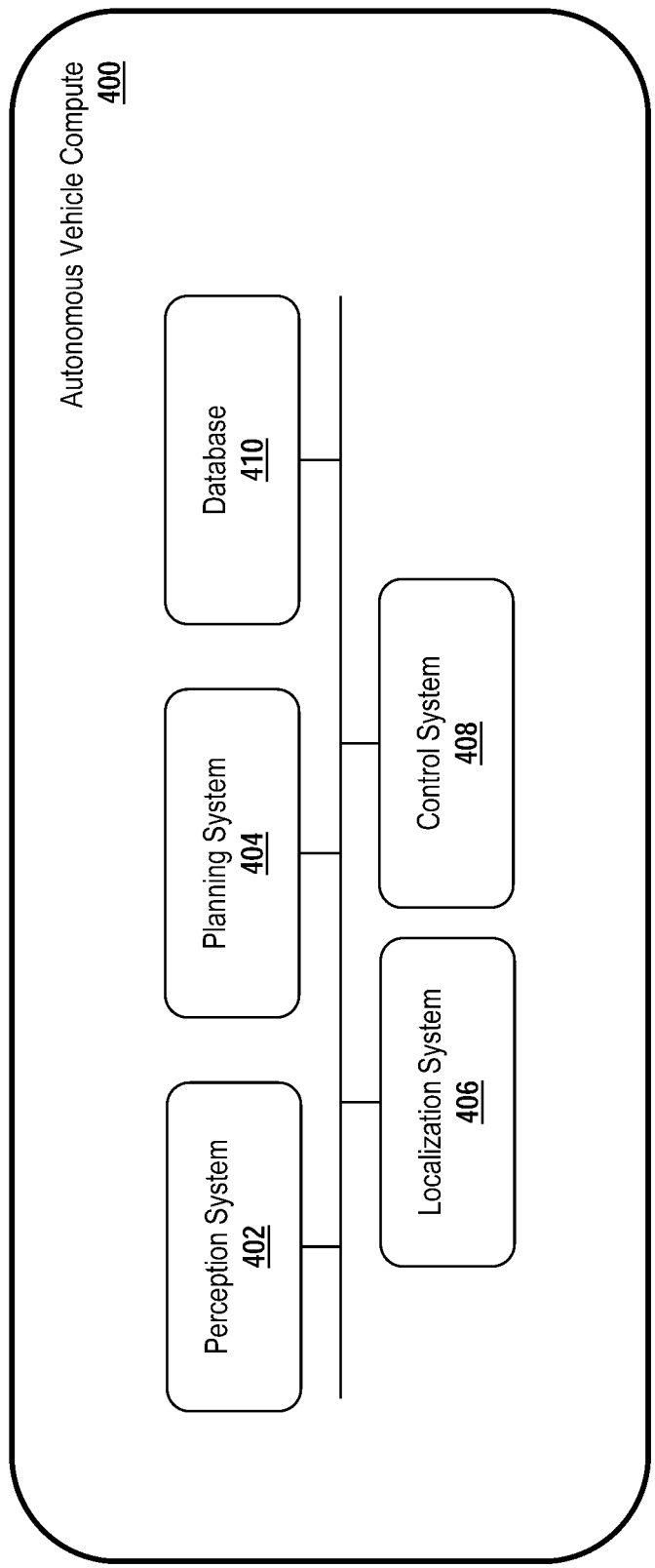
FIG. 4 is a diagram of certain components of an autonomous system in accordance with aspects of the present disclosure.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like).

In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Referring now to FIGS. 5A-5G, diagrams illustrating aspects of an implementation 500 of a process for multi-target tracking with dependent likelihood structures in accordance with the present disclosure are shown. In some embodiments, implementation 500 includes a vehicle 510. The vehicle 510 is a vehicle that is the same as or similar to the vehicles 102 of FIG. 1 and/or the vehicle 200 of FIG. 2. The vehicle 510 includes one or more devices that are the same as or similar to the device 300 of FIG. 3. Additionally, the vehicle 510 includes one or more devices that are the same as or similar to the autonomous vehicle compute device 400 of FIG. 4.

The vehicle 510 performs multi-target tracking with dependent likelihood structures in accordance with the present disclosure. For example, the vehicle 510 performs tracking with respect to vehicles 520, 530 present in an environment where the vehicle 510 is located. It is noted that while FIGS. 5A-5G show 2 vehicles (e.g., the vehicles 520, 530), the vehicle 510 may be adapted to perform multi-target tracking with respect to more than 2 vehicles or less than 2 vehicles using the tracking techniques disclosed herein. Additionally, the vehicle 510 may utilize the multi-target tracking to track other objects present in the environment, such as obstacle(s) 560. Obstacle(s) 560 may include street lights, street signs, walls, guard rails, or other physical objects present in the environment where the vehicle 510 is located.

Figure 5A:
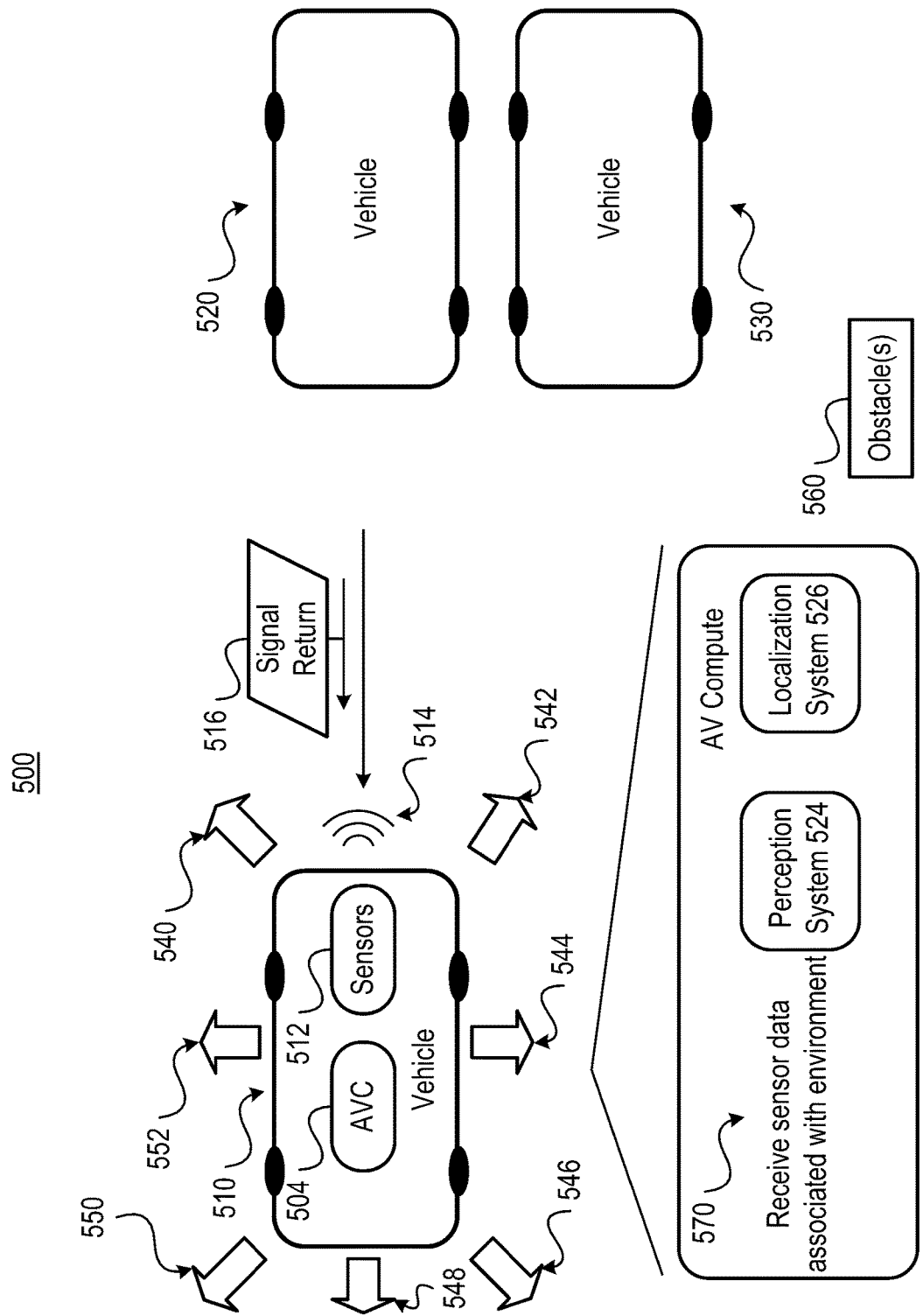
FIGS. 5A-5G are diagrams of an implementation of a process for multi-target tracking with dependent likelihood structures in accordance with the present disclosure.

As illustrated in FIG. 5A, the vehicle 510 includes one or more sensors 512. The one or more sensors 512 include sensor devices that are the same as or similar to the sensor devices of the vehicle 200 of FIG. 2, such as the cameras 202a, the LiDAR sensors 202b, the radar sensors 202c, and the microphones 202d. As shown by arrows 540, 542, 544, 546, 548, 550, 552, the one or more sensors 512 are configured to monitor the environment that the vehicle 510 is located in from one or more directions. In some embodiments, the one or more sensors 512 transmit a sensor signal 514 into the environment and receive a signal return 516. To illustrate, the sensor signal 514 includes light transmitted by a light emitter of the LiDAR sensor, and the sensor return 516 includes light reflections of the transmitted light by objects (e.g., the vehicles 520, 530, the obstacle(s) 560, and the like). As described above, the light reflections included in the signal returns 516 are received by a light detector of the LiDAR sensor and the light returns are processed to produce sensor data (e.g., a point cloud, a combined point cloud, and/or the like). It is noted that while the example above is described with reference to a LiDAR sensor, other types of sensors, such as cameras or microphones, may be utilized. For example, a camera may capture images of the environment and the images may be utilized to track objects present in the environment where the vehicle is located in accordance with the concepts disclosed herein.

As shown at block 570, the autonomous vehicle compute 504 receives sensor data associated with the environment where the vehicle is located. As described above, the sensor data includes data obtained using a LiDAR sensor, such as a point cloud, a combined point cloud, and/or the like, or includes other types of data obtained using other types of sensors. In an embodiment, the sensor data is evaluated by the perception system 524, which provides information about targets present in the environment, as described above with reference to FIG. 4. Additionally or alternatively, the sensor data is evaluated using the localization system 526, which determines the position of the vehicle 510 within the environment. Additionally, the localization system 526 determines the position of the vehicles 520, 530 based on the sensor data and information provided by the perception system 524. To illustrate, the perception system 524 provides information regarding objects (e.g., vehicles, obstacles, and the like) identified based on the sensor data to the localization system 526. The localization system 526 then utilizes the information regarding the objects identified by the perception system 524 and the sensor data to determine the positions of those objects within the environment.

Figure 5B:
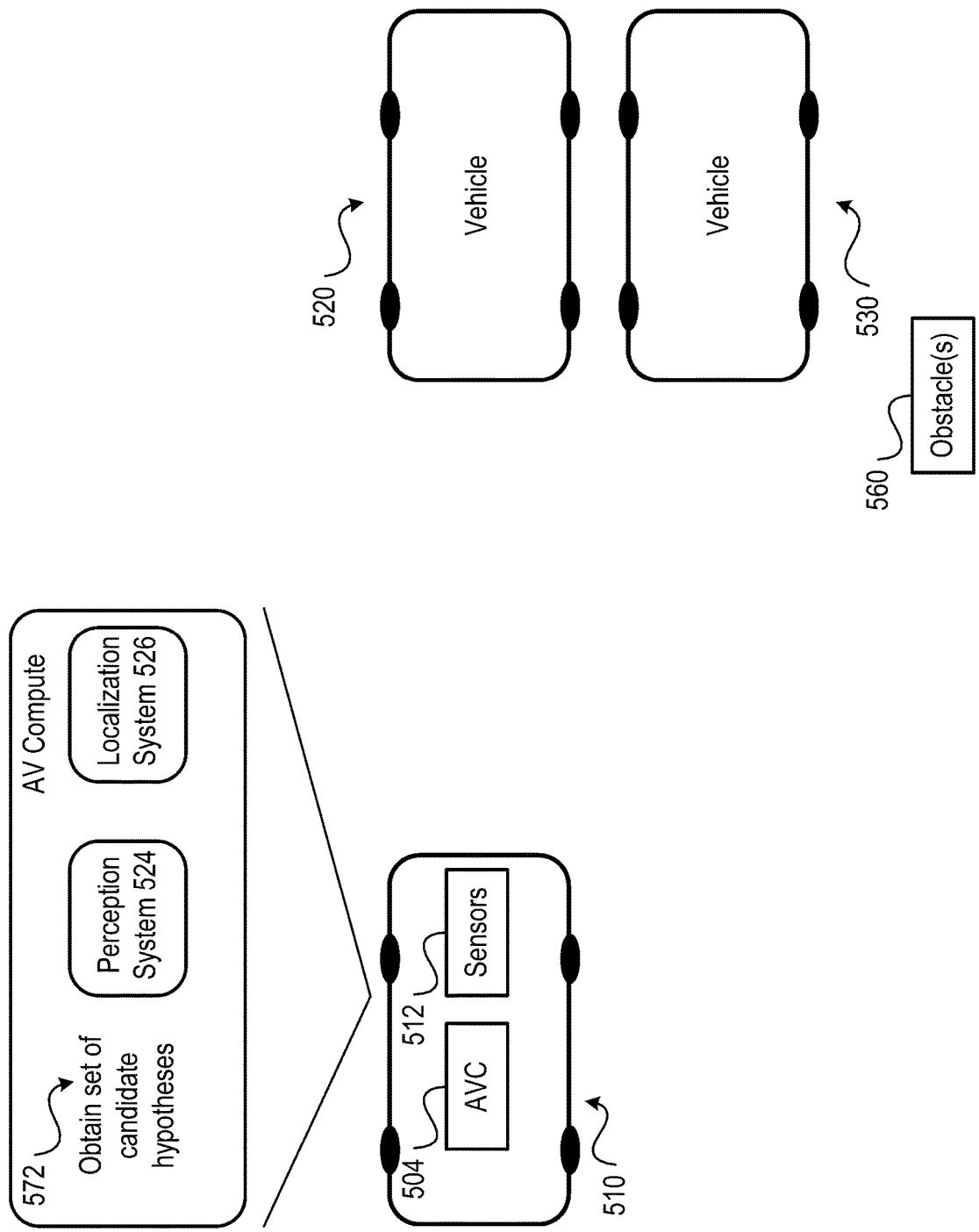

As shown in FIG. 5B, at block 572, the autonomous vehicle compute 504 obtains a set of candidate hypotheses based on the sensor data. In an aspect, each of the candidate hypotheses includes track information and measurement information derived from the sensor data. The track information and measurement information is derived from the sensor data, at least in part, via operations of the perception system 524 and the localization system 526. Each track corresponds to a target (e.g., a person, a pedestrian, a bicyclist, a vehicle, etc.) (sometimes referred to as a target of interest) being tracked by the vehicle 510. For example, a candidate hypothesis provides information representative of the environment at a particular instance of time, such as the position of the one or more tracked targets relative to each other and the vehicle 510. Exemplary details regarding the track information and the measurement information are described in more detail with reference to FIG. 7.

Figure 5C:
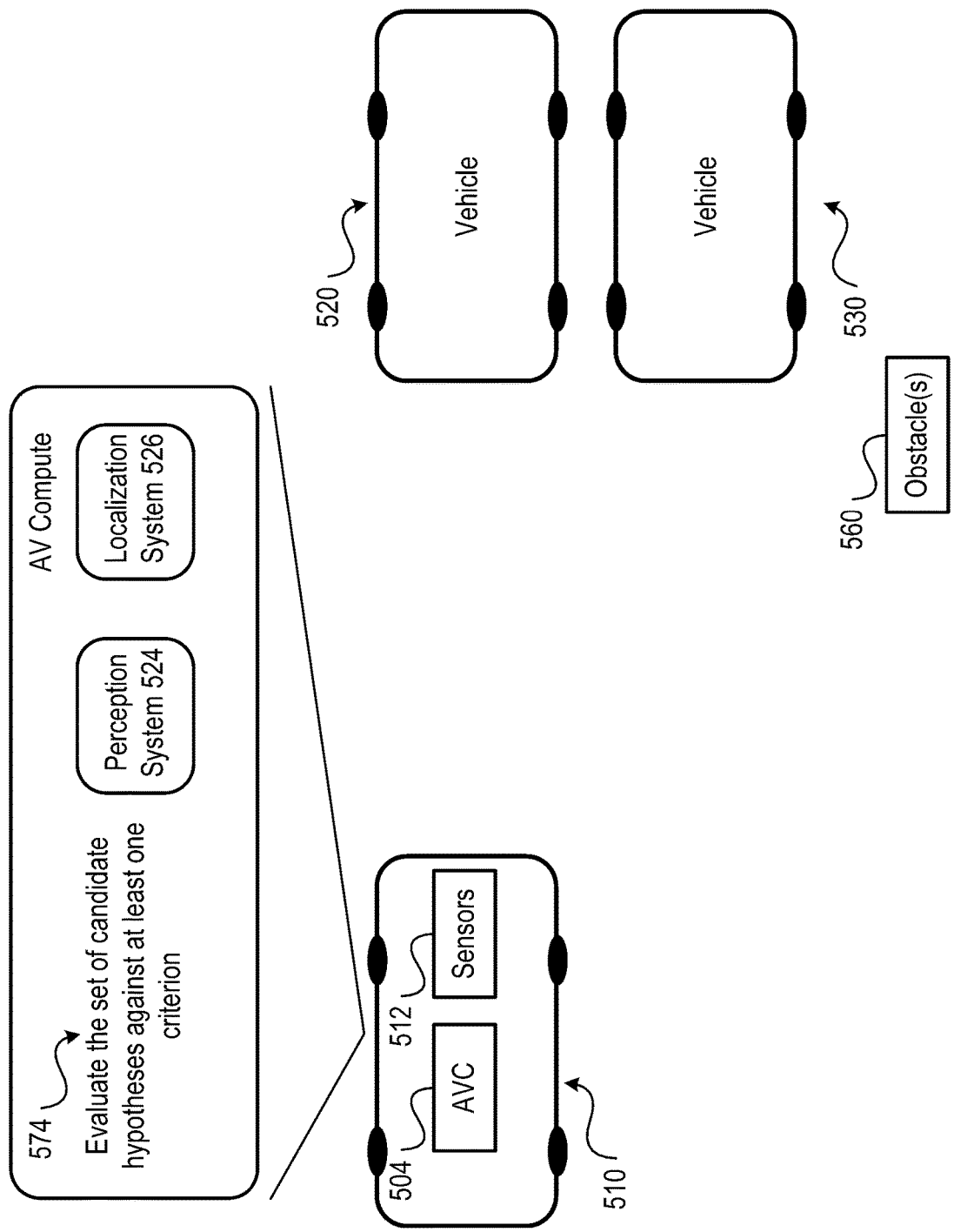

As shown in block 574 of FIG. 5C, the set of candidate hypotheses are evaluated against at least one criterion. In an aspect, the at least one criterion includes a ranking criterion configured to rank the set of candidate hypotheses. The ranking criterion assigns each of the candidate hypotheses a metric representative of a likelihood that a particular candidate hypothesis of the set of candidate hypotheses correctly identifies a location of the one or more targets independently (e.g., without taking into account other candidate hypotheses of the set of candidate hypothesis and/or a hypothesis from a previous time interval). While the ranking criterion enables the set of candidate hypotheses to be ordered based on the assigned ranking metric, such as from highest likelihood to lowest likelihood, tracking of multiple targets based on evaluation of the hypotheses independently may result in inaccuracies, especially with respect to certain conditions that may arise during tracking, such as collision conditions and occlusion conditions. Each of these conditions is described in more detail below.

Figure 5D:
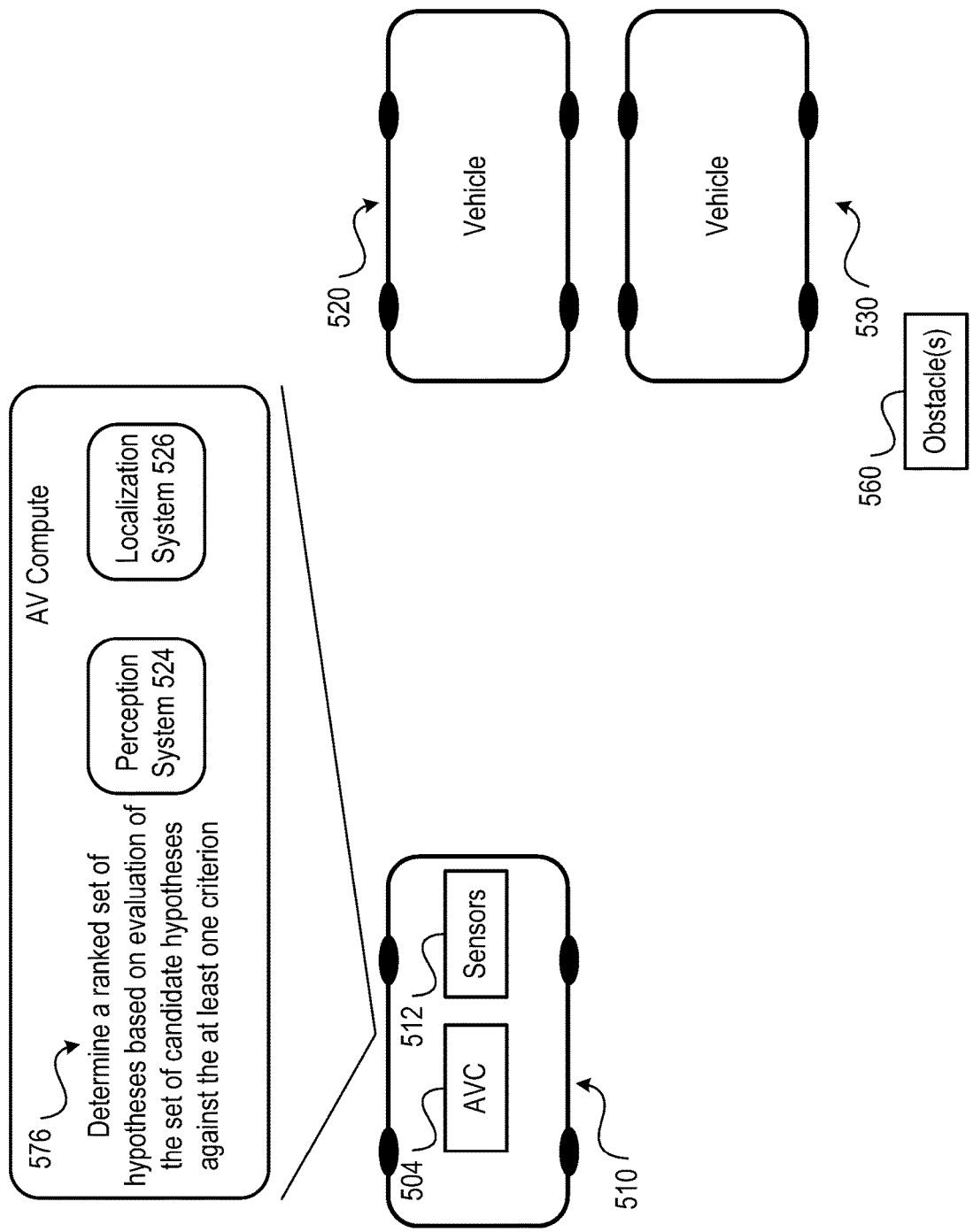

To address the issues that may arise when evaluating candidate hypotheses independently, the autonomous vehicle compute 504 determines a ranked set of hypotheses based on evaluation of the set of candidate hypotheses against the at least one criterion, as shown at block 576 of FIG. 5D. For example, as briefly described above, the ranking criterion enables the set of candidate hypotheses to be ordered according to a likelihood metric that is determined based on evaluation of each candidate hypotheses individually. This ranking metrics assigned to the set of candidate hypotheses based on the independent evaluation represents a proposed ranking, and the ranking determined at block 576 is utilized to verify the rankings of the set of candidate hypotheses. To facilitate the final ranking of the candidate hypotheses, the candidate hypotheses is ranked according to a collision criterion, an occlusion criterion, or both. The collision criterion and the occlusion criterion are configured to evaluate the candidate hypotheses while taking into account dependencies of the candidate hypotheses, and the ranked set of hypotheses are based on a determination of whether a particular candidate hypothesis of the set of candidate hypotheses correctly identifies a location of the one or more targets with dependencies taken into account.

Figure 8:
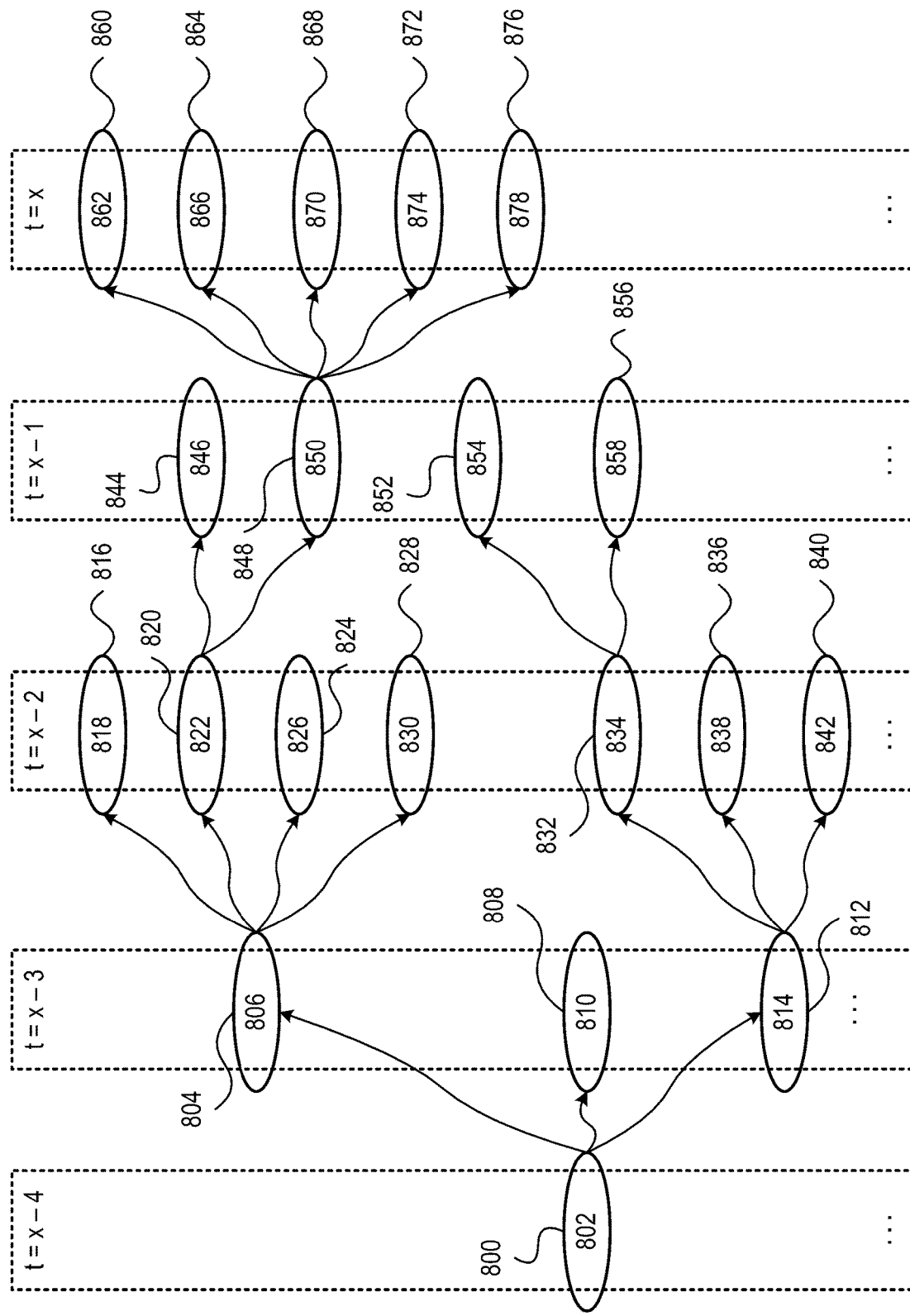
FIG. 8 is a block diagram illustrating aspects of performing multi-target tracking in accordance with the present disclosure.

For example, candidate hypotheses are generated or obtained at different time intervals (e.g., every 10 milliseconds (ms), 100 ms, 500 ms, 1 second, or another time interval) during tracking. As illustrated and described in more detail below with reference to FIG. 8, for each subsequent time interval, the candidate hypotheses that are generated or obtained depend from one of the hypotheses in a previous time interval. Thus, over time, a data structure is created that includes all candidate hypotheses obtained during tracking. As a non-limiting example, the data structure is in the form of a tree or linked list-type data structure, as shown in FIG. 8 and described in more detail below.

It is to be appreciated that such data structure may become increasingly large as the duration of the tracking increases, which requires the tracking to consume greater amounts of memory resources. However, the collision criterion and/or the occlusion criterion utilized by the multi-target tracking techniques of the present disclosure are configured to reduce the size of the data structure storing the candidate hypotheses, thereby reducing the amount of memory resources required to perform tracking. Additionally, despite the reduced size of the data structure, the collision criterion and/or the occlusion criterion used by the multi-target tracking techniques of the present disclosure may increase the accuracy of tracked targets, as explained in more detail below.

As briefly described above, the collision criterion and/or the occlusion criterion are used to evaluate the (proposed) rankings of the set of candidate hypothesis to produce a (final or verified) ranked set of hypotheses that takes dependencies into account. Evaluation of the candidate hypotheses based on the collision criterion may enable improbable or implausible conditions to be detected within the candidate hypotheses. For example, if a candidate hypothesis indicates that the vehicle 530 is to the left of the vehicle 520, but the vehicle 530 was to the right of the vehicle 520 in a parent hypotheses from which the candidate hypothesis depends, the collision criterion indicates that the candidate hypothesis contains a collision condition. The collision condition may indicate the candidate hypothesis contains implausible or improbable position or location information with respect to one or more of the tracked targets. In the example above, the vehicle 530 switching from one side of the vehicle 520 to the other side of the vehicle 520 represents an implausible or improbable change in relative position or location of vehicle 530 because the time difference between the candidate hypothesis and its parent hypothesis may be on the order of a few milliseconds (e.g., 10 ms, 100 ms, etc.) and it is improbable or implausible that the vehicles 520, 530 could change position in this manner in such a small timeframe.

When collision conditions are detected based on evaluation of a candidate hypothesis using the collision criterion, a ranking metric for the evaluated candidate hypothesis may be reduced. For example, a ranking metric for each candidate hypotheses is initially assigned a value based on the ranking criterion, which does not take dependency into account, and the ranking metric is set to a zero value when a collision condition is detected based on evaluation of the candidate hypothesis using the collision criterion. Candidate hypotheses that are evaluated using the collision criterion and are determined to not represent a collision condition is added to the (final) ranked set of hypotheses. As described in more detail below, the ranked set of hypotheses is used to perform tracking and, in some instances, facilitate operations to control navigation of the vehicle 510 or provide alerts to a driver (e.g., for semi-autonomous or non-autonomous vehicles).

Evaluation of the candidate hypotheses based on the occlusion criterion enables detection or verification of whether an occlusion condition is present in a candidate hypothesis. The occlusion condition occurs when a vehicle is blocked from the field of detection of the sensors. For example, if the vehicle 520 passes in front of the vehicle 530, the vehicle 530 may prevent the sensors from detecting the vehicle 520. However, in some instances, a missed detection occurs, where the sensors do not properly receive the signal return from an object. In such instances, evaluation of the candidate hypothesis using the ranking criterion appears to indicate an occlusion, since dependencies are not taken into account. It can be readily understood that such an incorrect understanding of the environment in which an autonomous vehicle is operating may be problematic and is undesirable.

To address this challenge, the occlusion criterion is used to evaluate each of the candidate hypotheses and verify whether an occlusion condition is present or not. For example, by taking into account dependency information, it is determined whether a vehicle is occluded or not, such as when the vehicle was present in a previous hypotheses but the candidate hypothesis under evaluation does not include measurement information indicating that vehicle is still present. Candidate hypotheses that do not include occlusion conditions or that correctly identify an occlusion condition is added to the (final) ranked set of hypotheses according to their assigned or proposed ranking metric (e.g., the ranking metric determined by the ranking criterion). However, a penalty metric is applied to metric values associated with candidate hypotheses that were incorrectly identified as including occlusion conditions during evaluation using the ranking criterion. The penalty metric is configured to reduce the metric values or ranking of candidate hypotheses that were incorrectly determined (e.g., based on the ranking criterion) to include an occlusion condition. Once the penalty metric is applied, the candidate hypothesis is added to the ranked set of hypotheses according to the reduced metric value.

As will be described in more detail below, utilizing the collision criterion and/or the occlusion criterion to produce a ranked set of hypotheses may reduce the number of hypotheses that need to be considered to achieve accurate tracking. For example, when the collision criterion is utilized, any hypotheses that include collision conditions is omitted from further use in tracking operations (e.g., candidate hypotheses associated with collision conditions does not produce child hypotheses within the tracking data structure). By identifying inaccurate candidate hypotheses using the collision criterion, tracking is performed using a smaller set of hypotheses as compared to previous tracking techniques. For example, the (final) ranked set of hypotheses includes only the top "X" ranked hypotheses selected from among the candidate hypotheses using the collision criterion. The top "X" ranked hypotheses may include 100 hypotheses, 200 hypotheses, or another number of hypotheses. Similarly, utilizing the occlusion criterion and the penalty metric may reduce the rank of inaccurate candidate hypotheses (e.g., candidate hypotheses containing incorrectly identified occlusion conditions). Thus, when the top "X" ranked hypotheses are selected for performing tracking, inaccurate hypotheses are less likely to be used, resulting in a more accurate set of information about the location and relationship of objects (e.g., vehicles, obstacles, and the like) present in the environment the vehicle 510 is located. The improved accuracy enables autonomous vehicles to make more intelligent decisions and reduce the likelihood of an accident occurring during autonomous navigation of the vehicle 510. In addition to improving accuracy, the reduced set of candidate hypotheses may also reduce the size of the data structure used to track targets of interest. The reduced size of the data structure enables more targets to be tracked and/or allow tracking to be performed with reduced computational resources (e.g., less memory or other hardware requirements). Evaluation of candidate hypotheses using collision and occlusion criterion are described in more detail below with reference to FIGS. 7-10.

Figure 5E:
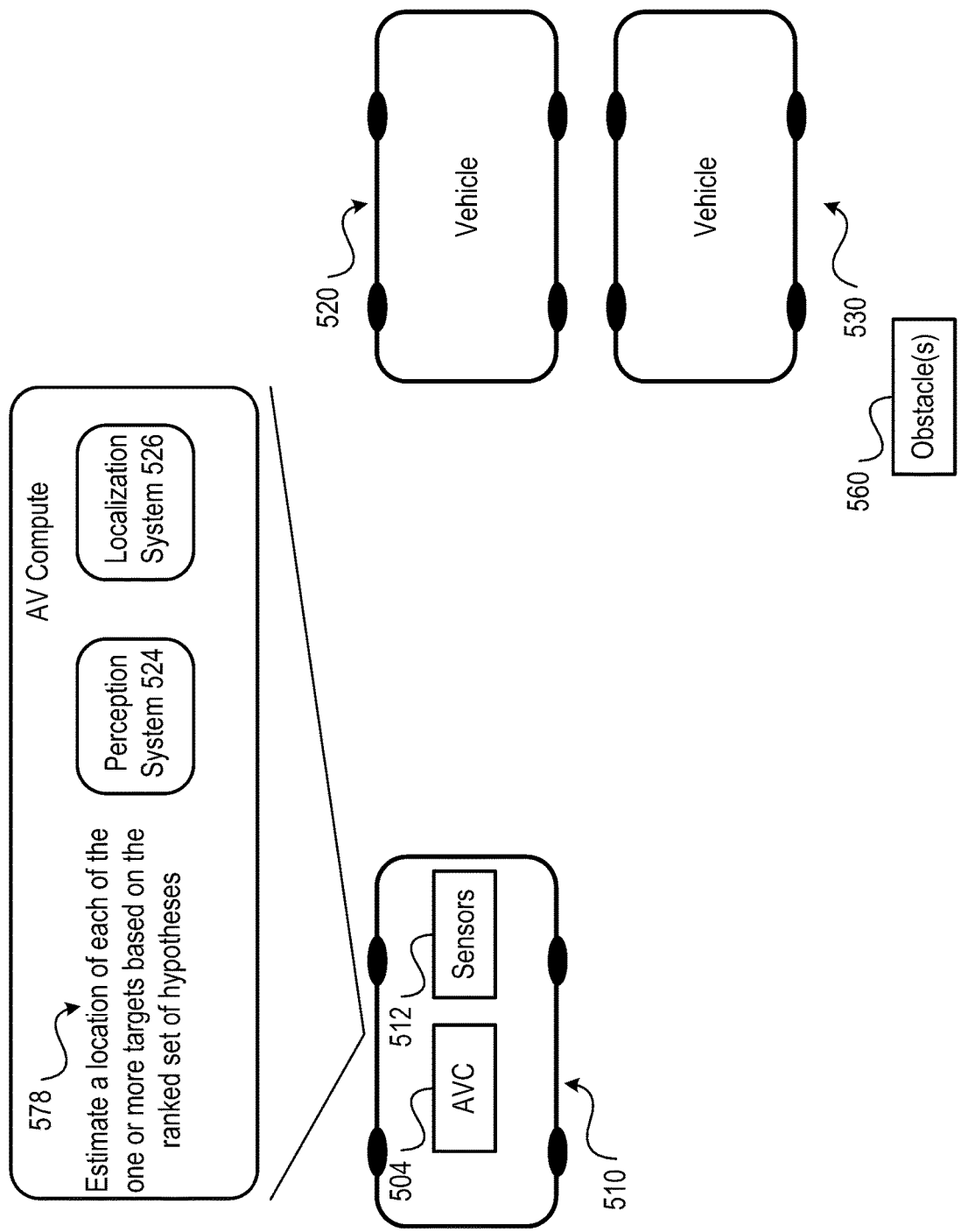

As shown at block 578 of FIG. 5E, the autonomous vehicle compute 504 estimates a location of each of the one or more targets based on the ranked set of hypotheses determined at block 576. As described above, the ranked set of hypotheses provides verified rankings of the hypotheses that takes into account dependencies of the hypotheses, which may enable problematic conditions (e.g., collision conditions and occlusion conditions) to be accounted for. The ability to account for such problematic conditions enables a more accurate understanding of the spatial relationship between the vehicle 510 and other objects present in the environment the vehicle 510 is located in, such as the vehicles 520, 530 and the obstacle(s) 560.

Figure 5F:
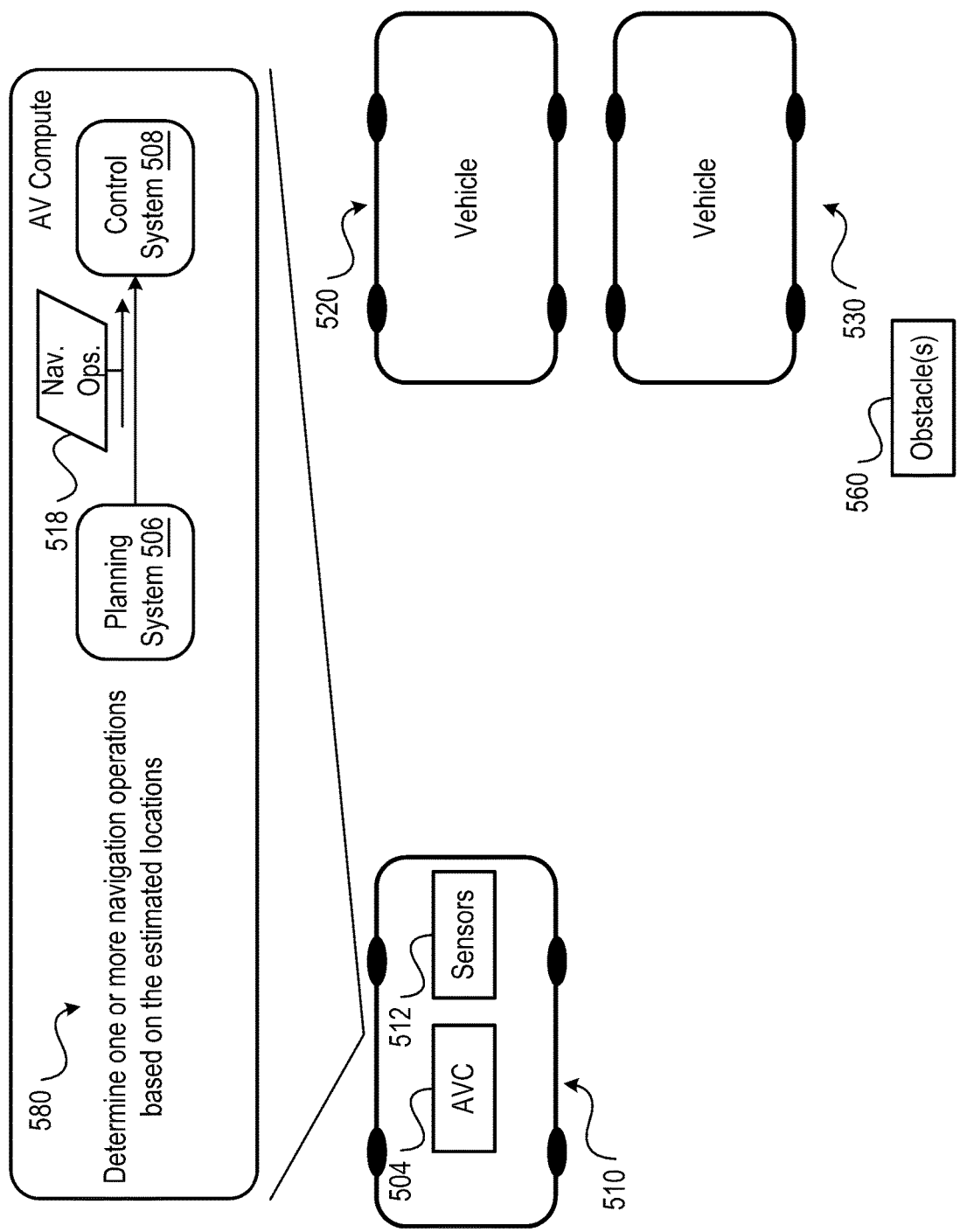

At block 580 of FIG. 5F, a planning system 506, which is the same as or similar to the planning system of FIG. 4, determines one or more navigation operations 518 based on the estimated locations of the targets. The one or more navigation operations includes adjustments or modifications to the speed of the vehicle 510, such as to speed up or slow down the vehicle 510, or to alter a path of travel of the vehicle 510 (e.g., turn or veer in a particular direction, etc.). Additional exemplary operations that may be performed by the planning system 506 are described above with respect to the planning system of FIG. 4. The one or more navigation operations 518 may be provided to a control system 508, which is the same as or similar to the control system of FIG. 4.

Figure 5G:
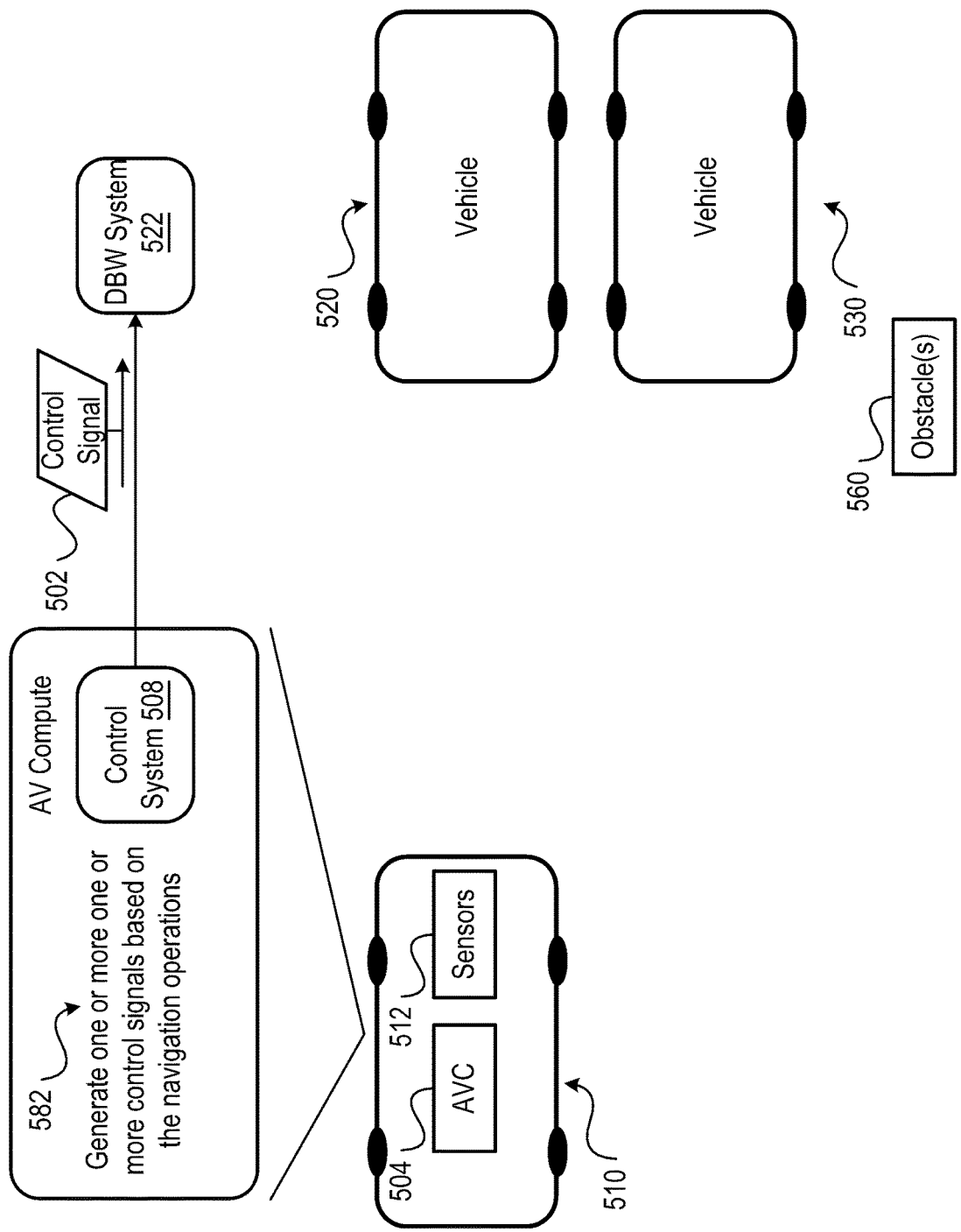

As shown in FIG. 5G, at block 582, the control system 508 generates one or more control signals 502 based on the navigation operations. The one or more control signals 502 includes commands to implement the one or more navigation operations 518. As illustrated in FIG. 5G, the one or more control signals 502 may be provided to a drive by wire system 522, which is the same as or similar to the drive by wire system of FIG. 2. As described above with reference to FIGS. 2 and 4, the drive by wire system 522 may control operation of a vehicle. To illustrate, the drive by wire system 522 utilizes the control signals 502 to control operations of a powertrain control system (e.g., powertrain control system 204 of FIG. 2, and/or the like), a steering control system (e.g., steering control system 206 of FIG. 2, and/or the like), and/or a brake system (e.g., brake system 208 of FIG. 2, and/or the like). It is noted that while FIGS. 5A-5G illustrate an exemplary implementation of a vehicle configured to perform multi-target tracking with dependent likelihood structures in accordance with the present disclosure, such implementation has been provided for purposes of illustration, rather than by way of limitation. Accordingly, it is to be understood that disclosed techniques for performing multi-target tracking with dependent likelihood structures may be readily applied to tracking use cases other than autonomous vehicles, such as tracking cells or other biology-related use cases, tracking people, tracking animals, tracking robots, and the like.

Figure 6:
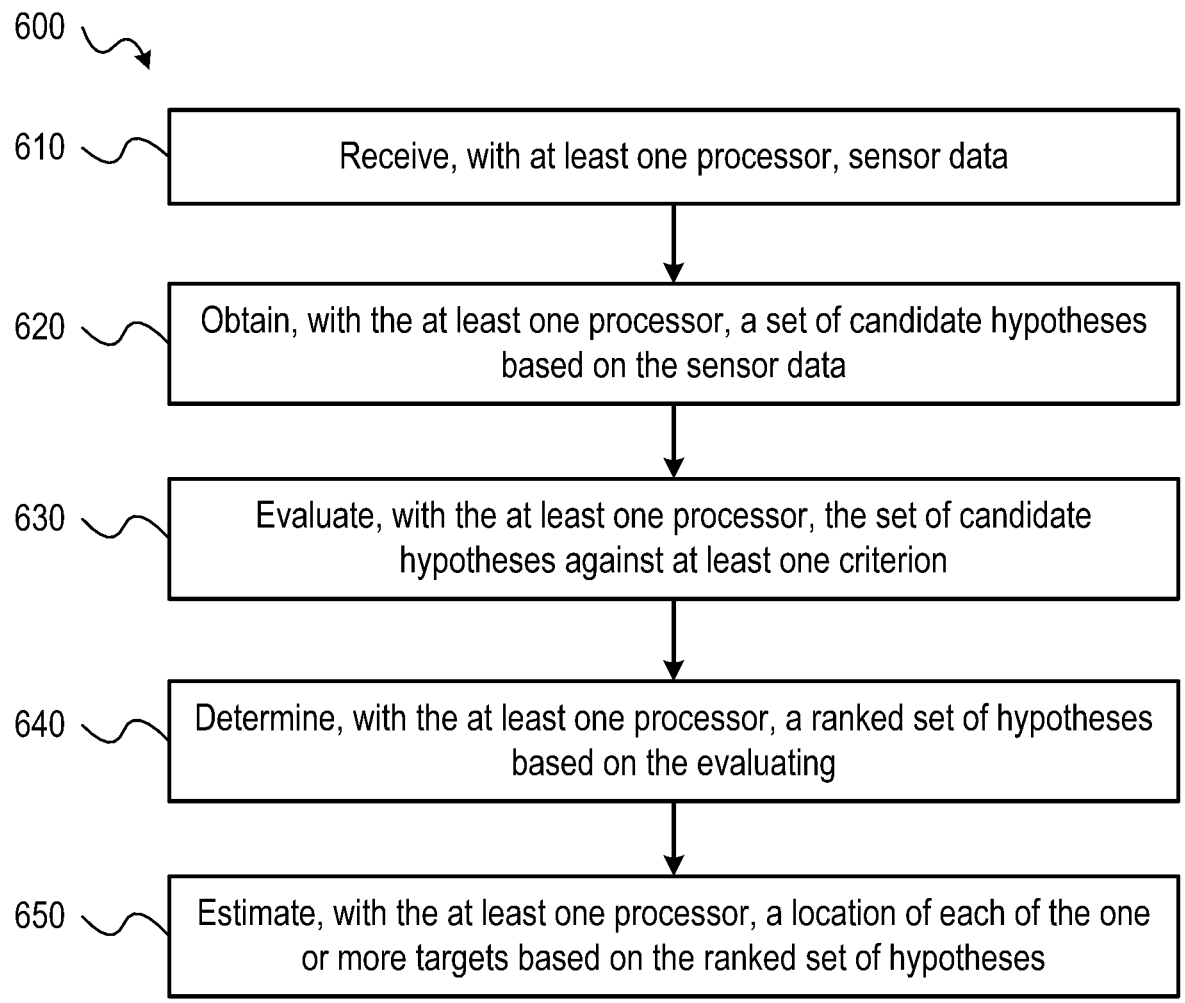
FIG. 6 is a flowchart of a process for performing multi-target tracking with dependent likelihood structures in accordance with the present disclosure.

Referring now to FIG. 6, illustrated is a flowchart of a process 600 for multi-target tracking with dependent likelihood structures in accordance with the present disclosure. In some embodiments, one or more of the steps described with respect to process 600 are performed (e.g., completely, partially, and/or the like) by an autonomous system, such as the vehicle 200 of FIG. 2. Additionally, alternatively, in some embodiments one or more steps described with respect to process 600 are performed (e.g., completely, partially, and/or the like) by another device or group of devices separate from or including autonomous vehicles, such as the remote AV system 114 of FIG. 1, the fleet management system 116 of FIG. 1, or the vehicle-to-infrastructure system 118 of FIG. 1. In an embodiment, operations of process 600 is stored in a memory (e.g., the memory 306 of FIG. 3) as instructions that, when executed by one or more processors (e.g., the processor(s) 304 of FIG. 3), cause the one or more processors to perform multi-target tracking with dependent likelihood structures in accordance with the present disclosure.

At block 610, process 600 includes receiving, with at least one processor, sensor data associated with an environment that a vehicle is located in. In an aspect, the sensor data includes LIDAR data associated with a point cloud, image data associated with an image, video data associated with a video, other types of sensor data, or combinations thereof. It is noted that while block 610 is described with reference to an environment that a vehicle is located in, process 600 is not limited to applications involving vehicles and may be readily applied to other use cases where the ability to perform multi-target tracking is desired. At block 620, process 600 include obtaining, with the at least one processor, a set of candidate hypotheses based on the sensor data. As described herein, each candidate hypothesis in the set of candidate hypotheses includes information corresponding to a track representative of a candidate location of one or more targets. The one or more targets include other vehicles (e.g., boats, cars, trucks, motorcycles, planes, drones) within the environment. In other use cases, the one or more targets include cells (e.g., cells being observed with a microscope), people, robots, animals, and the like. Additional exemplary aspects of candidate hypotheses are described below with reference to FIGS. 7-10.

At block 630, process 600 includes evaluating, with the at least one processor, the set of candidate hypotheses against at least one criterion. As described herein, the at least one criterion includes a collision criterion, an occlusion criterion, or both the collision criterion and the occlusion criterion. The collision criterion is configured to identify hypotheses (or tracks within hypotheses) associated with collision conditions. Exemplary aspects of collision conditions are described and illustrated in more detail below with reference to FIG. 7. The occlusion criterion is configured to identify hypotheses (or tracks within hypotheses) associated with correctly and incorrectly identified occlusion conditions. Exemplary aspects of occlusion conditions are described and illustrated in more detail below with reference to FIG. 7.

At block 640, process 600 includes determining, with the at least one processor, a ranked set of hypotheses based on the evaluation of the set of candidate hypothesis against the at least one criterion. As described herein, the tracking techniques of the present disclosure utilize a propose and verify approach that evaluates the candidate hypotheses (or the tracks of each candidate hypotheses) independently (e.g., without regard to prior hypotheses) to determine an initial or proposed ranking of the candidate hypotheses, as in block 630, and then the proposed ranking is verified using the at least one criterion. As a result of the verification, the (final) set of ranked hypotheses is produced and used for tracking the one or more targets of interest. It is noted that the ranked set of hypotheses may include a subset of hypotheses selected from among the set of candidate hypotheses based on the at least one criterion. Exemplary aspects of determining the set of ranked hypotheses used for tracking are described in more detail below with reference to FIGS. 7-10.

Process 600 includes, at block 650, estimating, with the at least one processor, a location of each of the one or more targets based on the ranked set of hypotheses. In an aspect, the estimated location is determined based on a current set of ranked hypotheses determined at block 640. For example, a final ranked set of hypotheses determined for a given time interval is analyzed to obtain an understanding of the locations of the tracked target(s) of interest by a vehicle. The vehicle utilizes the locations of the tracked target(s) of interest to determine one or more navigation operations to control navigation of the vehicle, such as to avoid contacting other vehicles or objects within the environment, slowing down to maintain a threshold distance from one or more vehicles within the environment, or other types of navigation operations. Upon determining the one or more navigation operations, a control signal is provided to a drive by wire system 522 (e.g., the drive by wire system 202h of FIG. 2). As a non-limiting and illustrative example, the drive by wire system 522 receives the control and then provides commands to a powertrain control system (e.g., the powertrain control system 204 of FIG. 2). The powertrain control system may then implement the navigation operations to control aspects of navigation of the vehicle. It is noted that the above-described functionality for controlling navigation of a vehicle has been provided for purposes of illustration, rather than by way of limitation and that vehicles implementing tracking techniques in accordance with the present disclosure may utilize a different process to control navigation. Regardless of the particular subsystems (e.g., drive by wire systems, powertrain control systems, etc.) that are utilized to control navigation, process 600 enables such control systems to rapidly obtain accurate information about the targets of interest being tracked within an environment and respond to changes to the location of the tracked targets. Such capabilities may increase the safety and reliability of autonomous navigation systems and mitigate the likelihood of an accident.

Additionally, process 600 enables more targets to be tracked since the tracking is performed based on a reduced set of hypotheses which is used to accurately track targets within the environment the vehicle is located in. Additionally, the reduced number of hypotheses used for tracking may enable tracking to be performed with less computational complexity, thereby enabling accurate tracking systems to be deployed at a reduced cost. It is noted that while some implementations are described herein as using process 600 and other aspects of the present disclosure to facilitate tracking in autonomous vehicles, embodiments of the present disclosure are not limited to such use cases. To illustrate, process 600 is also utilized in semi-autonomous vehicles, such as to override manual driving commands in the event that a potentially harmful situation is detected (e.g., automatically braking or turning if it is detected that the vehicle is getting close to a tracked target within the environment), and process 600 is also used in non-autonomous vehicles (e.g., vehicles that do not have any automatic navigation capabilities), such as to provide an audible alarm or alert to the driver when certain conditions are detected with respect to tracked targets (e.g., providing an audible alert when a target is getting close to the vehicle). It is further noted that process 600 is also readily utilized to track targets of interest other than vehicles, such as tracking cells based on image data provided by a microscope, tracking robots, tracking animals, or other situations where tracking is desired. Accordingly, it is to be understood that process 600 is not limited to use cases involving vehicles and instead provides an improved technique for accurately performing multi-target tracking with reduced computational complexity and improved accuracy.

Figure 7:
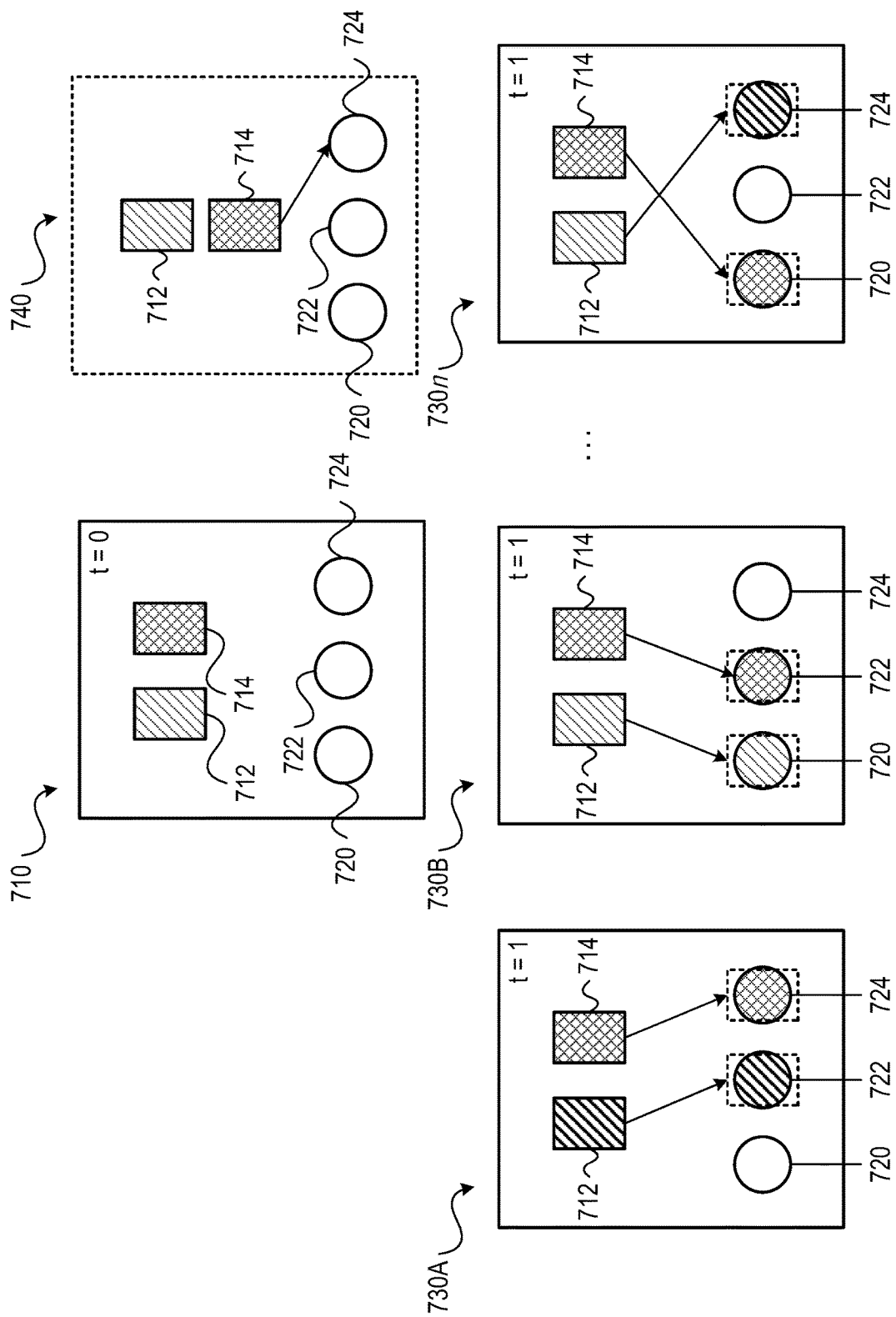
FIG. 7 is a block diagram illustrating aspects of a tracking system in accordance with the present disclosure.

Referring to FIG. 7, a block diagram illustrating aspects of a tracking system in accordance with the present disclosure is shown. In FIG. 7, a snapshot 710 and candidate hypotheses 730A, 730B, . . . , 730n are shown. The snapshot 710 includes tracks for a target of interest 712 and a target of interest 714. The snapshot 710 corresponds to a hypotheses selected for further use in tracking during a previous time interval, as described and illustrated in more detail with reference to FIG. 8. The track for the target of interest 712 corresponds to an estimated location within an environment for the target of interest 712 and the track for the target of interest 714 corresponds to an estimated location within an environment for the target of interest 714. For example, the target of interest 712 and the target of interest 714 may be vehicles (e.g., boats, cars, trucks, motorcycles, planes, drones, helicopters, etc.) and the tracks for the targets of interest 712, 714 corresponds to estimated locations within an environment (e.g., a roadway, a parking structure, etc.) where the vehicles are situated. In addition to other vehicles, the targets of interest may also include stationary targets of interest (e.g., street lamps, signs, or other objects within the monitored environment). It is noted that while some embodiments of the present disclosure are described with respect to tracking vehicles, such examples are provided by way of illustration, rather than by way of limitation and that the tracking techniques disclosed herein are not limited to vehicle tracking—indeed, tracking techniques according to the present disclosure may be readily applied to track targets of interest other than vehicles, such as cells, people, robots, animals, or other types of targets.

The snapshot 710 also includes measurements 720, 722, 724. The measurements are determined based on data observed by the tracking system (e.g., autonomous vehicle compute 202f of FIG. 2, autonomous vehicle compute 400 of FIG. 4, or autonomous vehicle compute 504 of FIGS. 5A-5G). The observed data corresponds to sensor data associated with an environment that a vehicle (or another type of target of interest) is located in. As described above, the sensor data includes a LIDAR scan (e.g., a point cloud, a merged point cloud, and/or the like). In this example, the data associated with the LiDAR scan is generated by a LiDAR device (e.g., a LiDAR device that is the same as or similar to or includes LiDAR sensor 202b of FIG. 2). It is noted that embodiments of the present disclosure may also obtain sensor data from other types of sensors. For example, the sensors include one or more cameras (e.g., a camera that is the same as or similar to camera 202a of FIG. 2) and the sensor data includes image data depicting a scene within the field of view of the camera or includes video data associated with a video. It is noted that other types of sensors (e.g., a radar sensor that is the same as or similar to radar sensor 202c of FIG. 2, a microphone sensor that is the same as or similar to microphone 202d of FIG. 2, and the like) and sensor data may also be utilized to perform tracking in accordance with the concepts disclosed herein. It is noted that FIG. 7 illustrates the measurements as including three measurements 720, 722, 724 for purposes of illustration, rather than by way of limitation, and that embodiments of the present disclosure may utilize sensor data that provides more than three measurements or less than three measurements.

As shown in FIG. 7, the snapshot 710 represents an understanding of the relationship between the targets of interest 712, 714 and the environment at a first point in time (e.g., time (t)=0). At a subsequent point in time (e.g., t=1), additional sensor data associated with the environment is received (e.g., from the sensors). The sensor data received at the subsequent point in time (e.g., t=1) is used to obtain the set of candidate hypotheses 730A, 730B, . . . , 730n. Each of the candidate hypotheses 730A, 730B, . . . , 730n correspond to a track representative of a candidate location of one or more targets. For example, suppose that in snapshot 710 the target of interest 712 is a first vehicle and the target of interest 714 is a second vehicle. In the candidate hypothesis 730A the target of interest 712 is estimated to be at the location indicated by measurement 722 and the target of interest 714 is estimated to be at the location indicated by measurement 724. In the candidate hypothesis 730B the target of interest 712 is estimated to be at the location indicated by measurement 720 and the target of interest 714 is estimated to be at the location indicated by measurement 722; and in the candidate hypothesis 730n the target of interest 712 is estimated to be at the location indicated by measurement 724 and the target of interest 714 is estimated to be at the location indicated by measurement 720.

Taking into account each track individually, it can be seen that all candidate hypotheses appear plausible. This is because when only the track associated with target of interest 712 is considered, it is reasonable that the target of interest 712 is located at any of the points indicated by the measurements of candidate hypotheses 730A-730n. Similarly, when only the track associated with target of interest 714 is considered, it is reasonable that the target of interest 714 is located at any of the points indicated by the measurements of candidate hypotheses 730A-730n. In an aspect, each of the candidate hypotheses is initially ranked according to analysis of each track individually (e.g., without taking into consideration other tracks or other tracked targets of interest).

As described above, in addition to evaluating the tracks and measurement data of the candidate hypotheses 730A-730n individually, tracking techniques according to the present disclosure also take into account dependencies between different tracks. When the tracks are considered with dependencies it can be seen that candidate hypotheses 730A and 730B represent plausible transitions in the position of the targets of interest 712, 714 during the time interval from t=0 to t=1. To illustrate, the target of interest 712 is estimated to be in a location associated with measurement 722 and the target of interest 714 is estimated to be in a location associated with measurement 724 based on the candidate hypothesis 730A, and the target of interest 712 is estimated to be in a location associated with measurement 720 and the target of interest 714 is estimated to be in a location associated with measurement 722 based on the candidate hypothesis 730B. The location estimates for candidate hypotheses 730A and 730B represent plausible location estimates since the targets of interest 712, 714 maintain their spatial relationship during the time interval from t=0 to t=1 (e.g., the target of interest 712 stays on the same side of the target of interest 714 and neither of the targets of interest 712, 714 were occluded during the time interval). As described above, the location estimates represented by candidate hypothesis 730A and 730B is determined to represent valid potential locations for the targets of interest 712, 714 and is therefore utilized for further tracking.

In contrast, the candidate hypothesis 730n represents an improbable or implausible transition in the location of the targets of interest 712, 714 during the time interval from t=0 to t=1. In particular, the targets of interest 712, 714 switch their positions or locations relative to each other during the time interval from t=0 to t=1; however, that time interval may represent a short amount of time, such as 1 second, a number of milliseconds (ms), or another timeframe. In such a small timeframe it would be very unlikely that the targets of interest 712, 714 could switch positions without colliding. As described above, tracking techniques of the present disclosure utilize a collision criterion or collision structure to detect occurrences of the situation represented by candidate hypothesis 730n, for example. Candidate hypotheses determined to represent collision events are not utilized by the tracking techniques disclosed herein, as described in more detail below with reference to FIG. 8.

In FIG. 7, another exemplary scenario that may be encountered during tracking is shown at candidate hypothesis 740. Candidate hypothesis 740 represents an occlusion scenario where the target of interest 712 is occluded by the target of interest 714. When such occlusion conditions occur it may be difficult to estimate the position of the occluded target of interest. For example, in candidate hypotheses where the occlusion condition is present it may be unclear whether the target of interest 712 is no longer in the environment (e.g., a vehicle being tracked has turned off the road), or whether the target of interest 712 is still present in the environment but prevented from being sensed because it is behind an object (e.g., another target of interest, a street sign, a wall, etc.). As described above, the situation represented by candidate hypothesis 740 is evaluated using an occlusion criterion to determine whether the target of interest is actually occluded or is not actually occluded. When the occlusion criterion indicates a target of interest within a candidate hypothesis (e.g., the hypothesis 740) is not actually occluded, that candidate hypothesis may not be used to perform further tracking. If, however, the occlusion criterion indicates that the target of interest is occluded, the candidate hypothesis may be retained for further use in tracking.

Referring to FIG. 8, a block diagram illustrating aspects of performing multi-target tracking in accordance with the present disclosure is shown. In FIG. 8, a plurality of candidate hypotheses are shown as including hypotheses 800, 804, 808, 812, 816, 820, 824, 828, 832, 836, 840, 844, 848, 852, 856, 860, 864, 868, 872, 876. Each of the hypotheses shown in FIG. 8 is obtained based on sensor data (e.g., a LIDAR scan, a point cloud, an image, video, and the like) associated with an environment (e.g., an environment that a vehicle is located in, an environment where cells are being observed, and the like), where the sensor data is captured by one or more sensors, such as a LIDAR device, a camera (e.g., a video camera, an imaging camera, an infrared camera, an RGB-D camera, etc.), a microscope, or other type of sensor.

As described above with reference to FIG. 7, each of the hypotheses include data associated with measurements (e.g., the measurements 720, 722, 724 of FIG. 7) derived from the sensor data and information that indicates a track associated with each measurement (e.g., the tracks associated with targets of interest 712, 714 of FIG. 7). For example, hypothesis 800 includes track and measurement data 802, hypothesis 804 includes track and measurement data 806, hypothesis 808 includes track and measurement data 810, hypothesis 812 includes track and measurement data 814, hypothesis 816 includes track and measurement data 818, hypothesis 820 includes track and measurement data 822, hypothesis 824 includes track and measurement data 826, hypothesis 828 includes track and measurement data 830, hypothesis 832 includes track and measurement data 834, hypothesis 836 includes track and measurement data 838, hypothesis 840 includes track and measurement data 842, hypothesis 844 includes track and measurement data 846, hypothesis 848 includes track and measurement data 850, hypothesis 852 includes track and measurement data 854, hypothesis 856 includes track and measurement data 858, hypothesis 860 includes track and measurement data 862, hypothesis 864 includes track and measurement data 866, hypothesis 868 includes track and measurement data 870, hypothesis 872 includes track and measurement data 874, and hypothesis 876 includes track and measurement data 878.

The track and measurement data for each hypothesis include information associated with one or more tracks associated with targets of interest and information associated with observed measurements. In a non-limiting example, the track and measurement data is stored in a database and each hypothesis only includes identifiers corresponding to each track and the associated measurement data. The track identifier (ID) identifies a particular track and the measurement ID provides a reference to the actual measurement data (in the database) associated with the corresponding track ID. To illustrate, the track and measurement data 802 for hypothesis 800 includes a track ID for one or more targets of interest being tracked and measurement IDs associated with measurement data assigned or associated with each of the track IDs. In an aspect, the track and measurement data specified as track ID and measurement ID pairs, such as $trackID_1.measurementID_1$ and $trackID_2.measurementID_2$, where $trackID_1.measurementID_1$ corresponds to a track associated with a first target of interest (e.g., target of interest 712 of FIG. 7) and $trackID_2.measurementID_2$ corresponds to a track associated with a second target of interest (e.g., target of interest 714 of FIG. 7).

As shown in FIG. 8, only some of the hypotheses are selected for further tracking. For example, hypothesis 800 is associated with a time interval t=x−4, hypotheses 804, 808, 812 is associated with a time interval t=x−3, hypotheses 816, 820, 824, 828, 832, 836, 840 is associated with a time interval t=x−2, hypotheses 844, 848, 852, 856 is associated with a time interval t=x−1, and hypotheses 860, 864, 868, 872, 876 is associated with a time interval t=x. In the time interval t=x−4, the hypothesis 800 is selected for further use in tracking the one or more targets of interest. For example, the hypothesis 800 is included in a ranked set of hypotheses and satisfy a threshold rank, where the threshold rank indicates hypotheses that should be utilized to track the one or more targets of interest during a next time interval (e.g., t=x−3). In an aspect, the threshold rank is a top 100 hypotheses. In additional or alternative aspects the threshold rank may be a top 200 hypotheses, a top 500 hypotheses, a top 1000 hypotheses, or some other ranking metric. In an aspect, the rank is determined using a dependent likelihood structure, such as the collision structure, the occlusion structure, or both, as described herein. It is noted that the dependent likelihood structure is utilized to determine a final ranking of a set of candidate hypotheses, but that other metrics and analysis may also be performed. For example, prior to ranking the candidate hypotheses and selecting a subset of the candidate hypotheses for use in further tracking, the candidate hypotheses is evaluated individually (e.g., without taking into account other targets of interest). In some instances, the dependent likelihood structure is used to confirm or validate the results of the individual evaluation of the candidate hypotheses.

To illustrate, the hypotheses 804, 808, 812 is part of a set of candidate hypotheses for the time interval t=x−3. The tracks associated with each of the hypotheses 804, 808, 812 is evaluated individually (e.g., without taking into account other tracks or tracked targets) to determine a likelihood that a measurement corresponds to the current location of the tracked target previously assigned to that track under evaluation. This produces an initial set of rankings according to the likelihood of each track. Subsequently, the tracks are evaluated against at least one criterion to determine a ranked set of hypotheses. As described above and illustrated in more detail below with reference to FIGS. 9 and 10, the ranked set of hypotheses determined based on the at least one criterion include a subset of the candidate hypotheses. For example, in FIG. 8, evaluation of the candidate hypotheses 804, 808, 812 results in the candidate hypotheses 804 and 812 being included in the ranked set of hypotheses while the candidate hypothesis 808 is not included. It is noted that the candidate hypothesis 808 is omitted from the ranked set of hypotheses for a variety of reasons, such as not including accurate information or simply being a lower ranked hypotheses than other hypotheses during the time interval t=x−3.

As illustrated in FIG. 8, selection of the ranked set of hypotheses for any particular time interval facilitates tracking of the targets of interest based on the ranked set of hypotheses determined during previous time intervals. For example, during the time interval t=x−3, tracking is performed based on the candidate hypotheses 804, 812; during the time interval t=x−2, tracking is performed based on the candidate hypotheses 820, 832; and during the time interval t=x−1, tracking is performed based on the candidate hypotheses 848. It is noted that FIG. 8 does not show all candidate hypotheses in a given time interval upon which tracking is performed and that tracking of the targets of interest takes into account many different hypotheses (e.g., 10 hypotheses, 100 hypotheses, 200 hypotheses, 1000 hypotheses, or more than 1000 hypotheses) for a particular time interval. As described above, the tracking techniques of the present disclosure provide an efficient technique for reducing the number of hypotheses used to perform tracking while maintaining sufficient levels of accuracy by pruning or omitting hypotheses that contain less accurate or inaccurate data. Reducing the number of candidate hypotheses may enable more targets to be tracked as well as minimize the computational complexity required to perform tracking, thereby enabling tracking to be performed more efficiently (e.g., both computationally and cost-wise).

Figure 9:
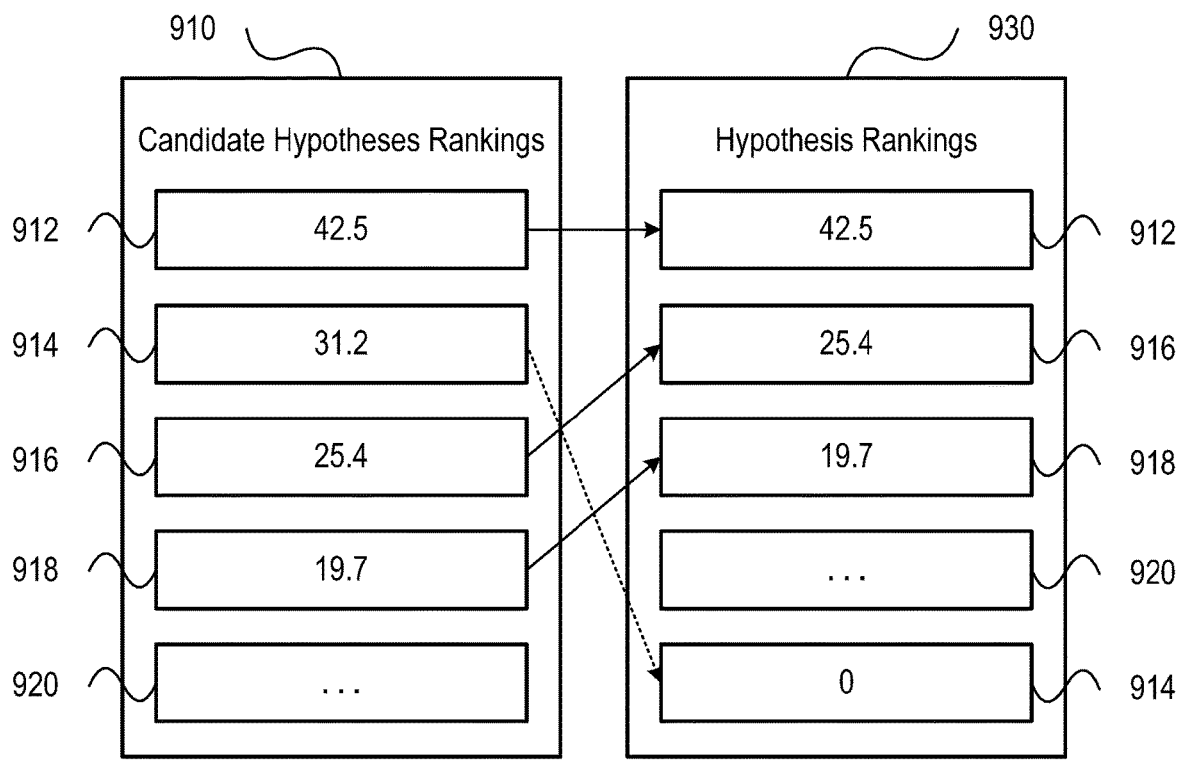
FIG. 9 is a block diagram illustrating exemplary aspects of a collision structure for tracking targets in accordance with the present disclosure.

Referring to FIG. 9, a block diagram illustrating exemplary aspects of a collision structure for tracking targets in accordance with the present disclosure is shown. More specifically, in FIG. 9, a set of candidate hypotheses rankings 910 is shown. The set of candidate hypotheses rankings 910 represent a ranking of candidate hypotheses for a time interval (e.g., one of the time intervals of FIG. 8) and the rankings are determined based on individual evaluation of the tracks—that is to say, the rankings 910 do not take into account dependencies between different tracked targets. As described above with reference to FIG. 7, when dependencies are not accounted for it may be difficult to detect implausible conditions, such as a collision conditions. To address this challenge, the set of candidate hypotheses rankings 910 are evaluated based on at least one criterion, such as a ranking criterion. The ranking criterion may be a collision criterion that is utilized to detect collision conditions, such as the collision condition illustrated in candidate hypothesis 730n of FIG. 7.

The at least one criterion, which in this example is a collision criterion, is used to evaluate the set of candidate hypotheses rankings 910 based on dependencies between the different tracks. Such evaluation or analysis enables the tracking to take into account insights regarding whether particular tracks and movements of the targets of interest represented by the candidate hypotheses under consideration are plausible, as in the hypotheses 730A and 730B of FIG. 7, or implausible, as in the hypothesis 730n of FIG. 7. For example, the set of candidate hypotheses rankings include rankings 912, 914, 916, 918, 920. Each of the rankings are associated with a ranking metric. For example, ranking 912 includes a ranking metric value of 42.5, ranking 914 includes a ranking metric value of 31.2, ranking 916 includes a ranking metric value of 25.4, ranking 918 includes a ranking metric value of 19.7, and so on. Because the ranking metrics for the rankings 912-920 are determined based on an independent assumption structure that considers each track individually, the ranking metrics do not reflect certain conditions, such as collision conditions.

To mitigate this problem, the set of candidate hypotheses rankings 910 are evaluated using the ranking criterion, which in this example is a collision criterion. During evaluation of the set of candidate hypotheses rankings 910 based on the ranking criterion, dependencies are accounted for. If the ranking metric is accurate and no collision conditions is detected, that candidate hypotheses are added to a ranked set of hypotheses 930. For example, in FIG. 9, the ranking 912 is determined to not include a collision condition and is added to the ranked set of hypotheses 930. In an aspect, the set of candidate hypotheses rankings 910 is ordered or ranked according to the ranking metrics and as a result is ranked in a particular order (e.g., highest to lowest) as the candidate hypotheses are added to the ranked set of hypotheses 930. For candidate hypotheses associated with collision conditions, such as the hypothesis associated with ranking 914, the ranking metric is assigned a zero (0) value and moved to the bottom of the ranked set of hypotheses 930. In an additional or alternative aspect, hypotheses identified as being associated with collision conditions based on the ranking criterion (e.g., the collision criterion) is omitted from the ranked set of hypotheses 930, flagged as being associated with collision conditions, or other types of designations or processing is used to designate that those hypotheses should not be used to perform further tracking.

As further illustrated in FIG. 9, the ranking 916 is determined, based on the ranking criterion, to not be associated with a collision condition, and is added to the ranked set of hypotheses 930. Similarly, the ranking 918 is determined, based on the ranking criterion, to not be associated with a collision condition, and is added to the ranked set of hypotheses 930. It is to be appreciated that the processing described above with respect to the rankings 912-918 may be repeated for each additional ranking 920, or at least until a threshold number of hypotheses have been added to the ranked set of hypotheses 930. In an aspect, the threshold number of hypotheses is 100 hypotheses, 200 hypotheses, 500 hypotheses, 1000 hypotheses, or some other number of hypotheses that do not contain a collision condition. In an additional or alternative aspect, the ranked set of hypotheses 930 is determined based on factors other than a threshold number of hypotheses. For example, the ranked set of hypotheses 930 is determined based on a threshold ranking metric, where hypotheses associated with a ranking metric above the threshold ranking metric and that are not associated with collision conditions is added to the ranked set of hypotheses 930.

It is noted that tracking operations are improved regardless of the type of threshold that is used to produce the ranked set of hypotheses 930. For example, suppose there are 10,000 candidate hypotheses to be considered and that the threshold number of hypotheses is configured to produce a ranked set of hypotheses 930 that includes the top "X" hypotheses that do not include a collision condition, where "X"<501. Rather than having to evaluate all 10,000 candidate hypotheses to perform tracking during each time interval, only a fraction of the total number of candidate hypotheses is considered. This reduces the amount of time required to evaluate the position information included in the ranked set of hypotheses 930 for any particular time interval and reduces the computational complexity of the tracking (e.g., requires less memory, consumes less processor bandwidth, etc.), which may allow tracking to be performed more quickly or allow navigational operations to be determined more rapidly based on (e.g., in response to) changes in the location of the tracked target(s). Similarly, where the threshold is a threshold ranking metric, any candidate hypotheses below the threshold ranking metric need not be considered.

Moreover, tracking operations become more accurate by omitting or reducing the rank of candidate hypotheses associated with collision conditions (e.g., because implausible or improbable changes in relative position or location of the tracked targets may be omitted from consideration in future time periods). To illustrate, in the example of FIG. 7, suppose that the candidate hypotheses 730n is carried forward (e.g., added to the ranked set of hypotheses 930). During a next time period, candidate hypotheses 730n serves as a new snapshot (e.g., similar to snapshot 710 of FIG. 7) and is used to evaluate dependencies for the targets of interest based on measurements obtained during the next time period. It can appreciated that using improbable or implausible information about the location of the targets of interest 712, 714 from hypothesis 730n may decrease the accuracy of the tracking during the next time period. Thus, eliminating collision conditions from the ranked set of hypotheses 930 may improve the overall accuracy of the tracking during subsequent time periods.

Figure 10:
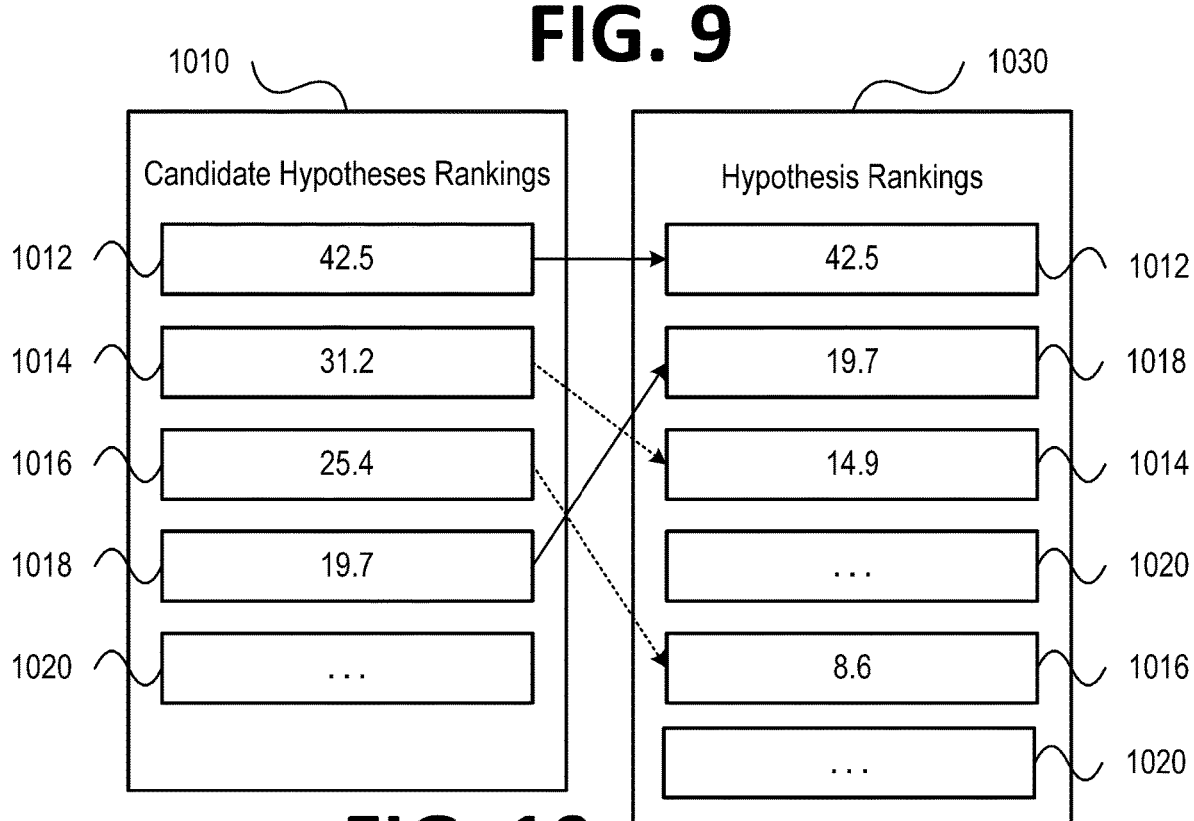
FIG. 10 is a block diagram illustrating exemplary aspects of an occlusion structure for tracking targets in accordance with the present disclosure.

Referring to FIG. 10, a block diagram illustrating exemplary aspects of an occlusion structure for tracking targets in accordance with the present disclosure is shown. As explained above, a target of interest may become occluded during tracking. This may occur, for example, when a first vehicle is tracking two vehicles travelling in front of the first vehicle and in the same direction as the first vehicle and one of the tracked vehicle passes in front of the other tracked vehicle. When this occurs, the passing vehicle may become occluded by the other tracked vehicle, making it difficult to detect the passing vehicle by the sensors of the first vehicle used to perform tracking. To overcome this challenge, tracking operations according to the present disclosure utilizes an occlusion structure to evaluate candidate hypotheses, as described in more detail below.

In FIG. 10, a set of candidate hypotheses rankings 1010 is shown. The set of candidate hypotheses rankings 1010 represent a ranking of candidate hypotheses for a time interval (e.g., one of the time intervals of FIG. 8) and the rankings are determined based on individual evaluation of the tracks—that is to say, the rankings 1010 do not take into account dependencies between different tracked targets. When dependencies are not accounted for it may be difficult to detect occlusion conditions. To address this challenge, the set of candidate hypotheses rankings 1010 are evaluated based on at least one criterion, such as a ranking criterion. The ranking criterion may be an occlusion criterion that is utilized to detect occlusion conditions, such as the occlusion condition illustrated in candidate hypothesis 740 of FIG. 7.

The at least one criterion, which in this example is an occlusion criterion, is used to evaluate the set of candidate hypotheses rankings 1010 based on dependencies between the different tracks. Such evaluation or analysis enables the tracking to take into account insights regarding whether particular tracks and movements of the targets of interest represented by the candidate hypotheses under consideration are occluded, as in hypothesis 740 of FIG. 7. For example, the set of candidate hypotheses rankings 1010 include rankings 1012, 1014, 1016, 1018, 1020. Each of the rankings are associated with a ranking metric. For example, ranking 1012 includes a ranking metric value of 42.5, ranking 1014 includes a ranking metric value of 31.2, ranking 1016 includes a ranking metric value of 25.4, ranking 1018 includes a ranking metric value of 19.7, and so on. Because the ranking metrics for the rankings 1012-1020 are determined based on an independent assumption structure that considers each track individually, the ranking metrics may not accurately reflect certain conditions, such as occlusion conditions. To illustrate, a track corresponding to a target of interest is not indicated in the measurements for a particular time interval due to an occlusion condition, due to a missed detection (e.g., the sensor(s) failed to detect the target of interest despite the target of interest being present in the environment monitored by the sensor(s)), or it may be that the vehicle is no longer in the monitored environment (e.g., a vehicle exited the road). Distinguishing between these different possibilities may be difficult when considered using the independent likelihood structure.

To mitigate this problem, the set of candidate hypotheses rankings 1010 are evaluated using a ranking criterion, which in this example is the occlusion criterion. The ranking or occlusion criterion accounts for dependencies, which enables more efficient determinations of whether a target of interest is present within the environment but occluded, or not present in the environment. The occlusion criterion indicates whether a particular target of interest for a hypothesis satisfies an occlusion condition by taking into account dependencies. For example, in FIG. 8 an occlusion is initially detected in hypotheses 820 without considering any dependencies, and then the occlusion criterion is used to evaluate whether a particular target represented in hypothesis 820 is included by taking into account hypothesis 804, from which hypothesis 820 depends. Where an occlusion condition does not exist, or a target of interest is actually occluded, the ranking metrics is not altered and the ranking is added to the ranked set of hypotheses 1030. For example, in FIG. 10 the ranking 1012 is determined to correctly include a collision condition (e.g., a track was identified as occluded by the independent structure and as occluded by the occlusion criterion taking into account dependencies) and is added to the ranked set of hypotheses 1030. In an aspect, the set of candidate hypotheses rankings 1010 is ordered or ranked according to the ranking metrics and as a result is ranked in a particular order (e.g., highest to lowest) as the candidate hypotheses are added to the ranked set of hypotheses 1030.

For candidate hypotheses associated with tracks having rankings that are incorrectly identified as representing occlusion conditions, such as the hypothesis associated with ranking 1014, a penalty metric is applied to the corresponding metric value and then the hypothesis is moved to the appropriate position within the ranked set of hypotheses 1030. The penalty metric reduces the corresponding metric value used to rank the set of hypotheses 1010 prior to including the hypothesis in the ranked set of hypotheses 1030. For example, in FIG. 10 the ranking 1014 has a metric value of 31.2, but after evaluation of the information associated with the ranking 1014 the metric value is modified using the penalty metric, which yields a metric value of 14.9. The hypothesis associated with the metric value of 14.9 is then added to the ranked set of hypotheses 1030 but at a lower rank than it would otherwise have been based on the metric value provided in the set of candidate hypotheses rankings 1010 (e.g., the metric value of 31.2). By applying the penalty metric to hypotheses associated with occlusion conditions that were incorrectly identified in the set of candidate hypotheses 1010, incorrect or less accurate hypotheses may appear lower in the ranked set of hypotheses 1030. Because the ranking metrics for less accurate hypotheses (e.g., hypotheses associated with incorrectly identified occlusion conditions) are reduced, over time (e.g., over multiple time intervals, such as from t=x−4 to t=x in FIG. 7), more accurate hypotheses may rise to the top of the set of ranked hypotheses 1030 and the less accurate hypotheses will fall to the bottom. As described above with reference to the set of ranked hypotheses 930, by using only a subset of the set of ranked hypotheses 1030, such as a top "X" hypotheses, the tracking of targets of interest may be more accurate (e.g., because less accurate hypotheses will be lower in the ranked set of hypotheses and less likely to be used during subsequent time intervals).

As further illustrated in FIG. 10, the ranking 1018 is determined, based on the ranking criterion, to not be associated with an occlusion condition or to correctly identify an occlusion condition, and is added to the ranked set of hypotheses 1030 without penalty to the ranking metric of 19.7. Additionally, the ranking 1016 is determined, based on the ranking criterion, to be associated with an incorrectly identified occlusion condition and the penalty metric is applied to change the ranking metric from 25.4 to 8.6 prior to incorporating the ranking 1016 into the ranked set of hypotheses 1030. It is to be appreciated that the processing described above with respect to the rankings 1012-1018 may be repeated for each additional ranking 1020, or at least until a threshold number of hypotheses have been added to the ranked set of hypotheses 1030. In an aspect, the threshold number of hypotheses may be 100 hypotheses, 200 hypotheses, 500 hypotheses, 1000 hypotheses, or some other number of hypotheses. In an additional or alternative aspect, the ranked set of hypotheses 1030 may be determined based on factors other than a threshold number of hypotheses. For example, the ranked set of hypotheses 1030 is determined based on a threshold ranking metric, where hypotheses associated with a ranking metric above the threshold ranking metric and that are not associated with collision conditions is added to the ranked set of hypotheses 1030.

It is noted that tracking operations are improved regardless of the type of threshold that is used to produce the ranked set of hypotheses 1030. For example, suppose there are 10,000 candidate hypotheses to be considered and that the threshold number of hypotheses is configured to produce a ranked set of hypotheses 1030 that includes the top "X" hypotheses, where "X"<501. Rather than having to evaluate all 10,000 candidate hypotheses to perform tracking during each time interval, only a fraction of the total number of candidate hypotheses may be considered. Moreover, because of the penalty metric, hypotheses that provide inaccurate information (e.g., incorrectly identified occlusions) may have a lower ranking metric and thereby be less likely to be included in the set of hypotheses upon which tracking is based for future time intervals. This reduces the amount of time required to evaluate the position information for any particular time interval and reduces the computational complexity of the tracking, which may allow tracking to be performed more quickly or allow navigational operations to be determined more rapidly based on (e.g., in response to) changes in the location of the tracked target(s). Similarly, where the threshold is a threshold ranking metric, any candidate hypotheses below the threshold ranking metric need not be considered. Moreover, by omitting or reducing the rank of candidate hypotheses associated with incorrectly identified occlusion conditions, tracking operations may become more accurate.

Figure 11:
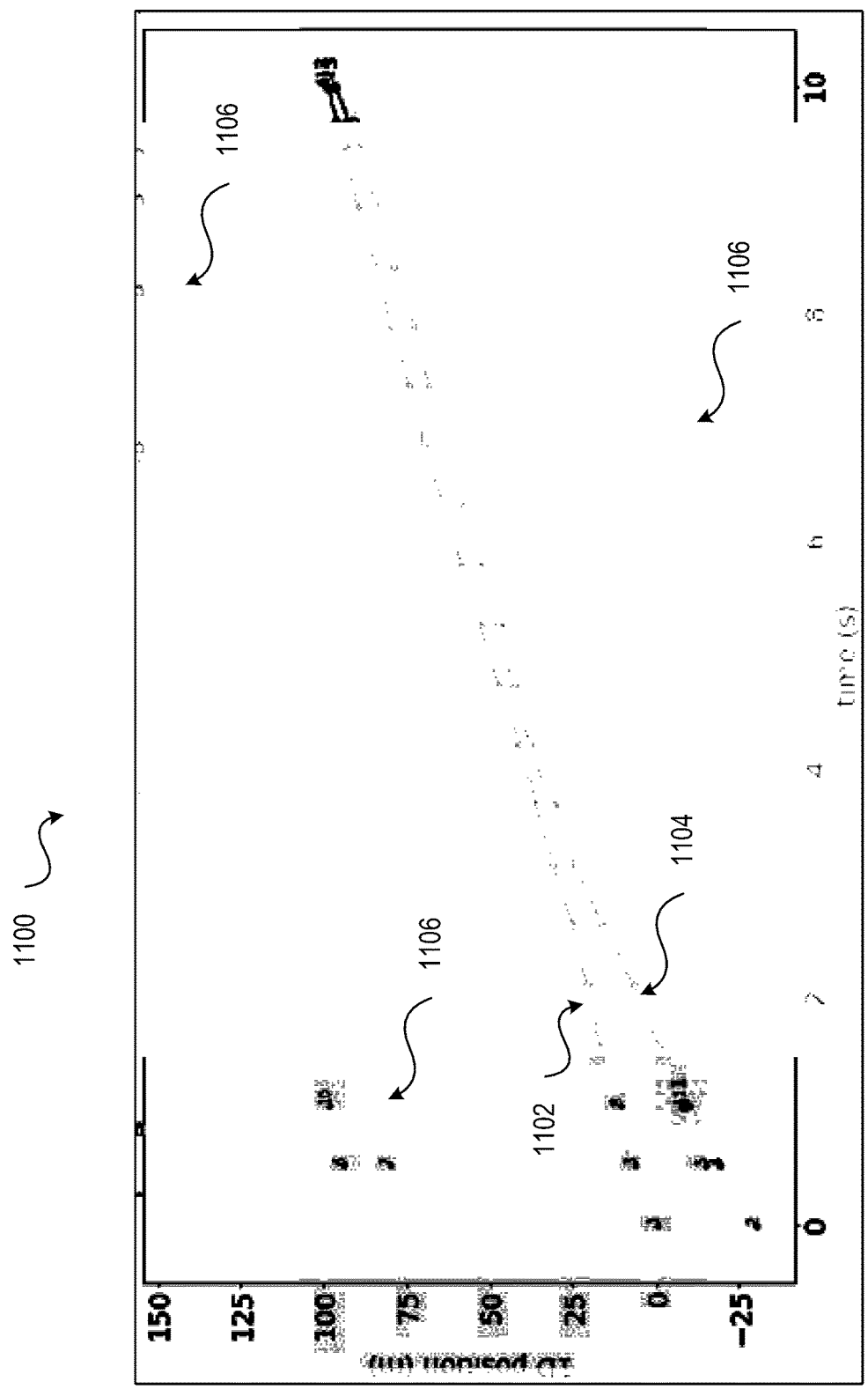
FIG. 11 is a plot illustrating tracking in accordance with the present disclosure.

Referring to FIG. 11, a plot illustrating tracking in accordance with the present disclosure is shown as a plot 1100. The plot 1100 was created from a one-dimensional simulation involving two targets of interest. The two targets of interest used for the simulation were vehicles travelling on a one-lane road and the tracking of each vehicle was modeled as a series of points. As can be seen in plot 1100, the first vehicle traveled along the path indicated by line 1102 connecting the different points observed with respect to the first vehicle during the tracking, and the second vehicle traveled along the path indicated by line 1104 connecting the different points observed with respect to the second vehicle during the tracking. Points 1106 in the plot represent noise present in the modeled scenario.

Referring to FIGS. 12A and 12B, a plot illustrating tracking based on an independence assumption is shown as a plot 1200. The plot 1200 was created from a one-dimensional simulation involving two targets of interest similar to the simulation used to create the plot 1100 of FIG. 11, with the first vehicle being represented by line 1202 and the second vehicle being represented by line 1204. Points 1206 in the plot represent noise present in the modeled scenario. The measurements used to produce the plot 1100 were processed using a collision structure, as described above with reference to FIGS. 7 and 9, while the measurements used to produce the plot 1200 were processed using a tracking algorithm that assumed independence (e.g., does not account for dependencies). It can be seen in plot 1100 that both of the tracked vehicles follows a generally linear path and neither vehicle switched positions. In contrast, the plot 1200 illustrates that the two vehicles appear to overtake one another or switch positions, similar to the hypothesis 730n of FIG. 7. The switching of the positions of the two vehicles is shown more clearly in FIG. 12B, which shows a zoomed in view 1208 of the plot 1200 of FIG. 12A.

It is to be appreciated that FIGS. 11, 12A, and 12B illustrate that the collision structure more accurately tracks the position of targets of interest as compared to other tracking techniques. In particular, FIGS. 11-12B show that utilizing a propose and verify approach with the collision structure, where initial rankings are determined using independent likelihood structures and then verified based on the presence of a collision condition to produce the final rankings used for tracking, may improve the accuracy of tracking systems and provide better situational awareness of how targets of interest are moving within an environment. Such capabilities may be particularly relevant to autonomous systems. To illustrate, autonomous vehicles utilize sensor data to observe an environment and make navigation decisions or execute maneuvers based on analysis of the sensor data and the observed environment. Providing more accurate tracking enable the autonomous vehicle (e.g., one or more systems, downstream systems, etc. of the autonomous vehicle or a system involved in controlling operation of the autonomous vehicle) to make better decisions with respect to navigation of the vehicle and reduce a likelihood of an accident.

It is noted that while the description above has described use of the collision criterion or occlusion criterion separately, in some implementations of the present disclosure the collision criterion and the occlusion criterion may be utilized together. For example, a set of candidate hypotheses are evaluated as described with reference to FIG. 9 to identify hypotheses associated with collision events. The hypotheses associated with collision events are then removed from the set of hypotheses under consideration and the occlusion criterion are used to evaluate the remaining hypotheses as described above with reference to FIG. 10. In this manner, rankings corresponding to hypotheses associated with collision conditions are reduced to zero, meaning that they need not be considered by the occlusion criterion, and then any remaining hypotheses can be evaluated to identify hypotheses associated with no occlusion condition or actual occlusion conditions, as well as reduce the rank of any hypotheses where occlusion conditions are incorrectly identified. It is noted that the example above describes evaluating the candidate hypotheses using the collision criterion first and then evaluating the hypotheses using the occlusion criterion for purposes of illustration, rather than by way of limitation, and the occlusion criterion may be used to evaluate the hypotheses before evaluation using the collision criterion if desired, or both may be used simultaneously to evaluate the candidate hypotheses.

The description above conceptually illustrates exemplary aspects of using a collision structure (e.g., the collision criterion) and/or an occlusion structure (e.g., the occlusion criterion) to perform multi-target tracking with dependent likelihood structures in accordance with embodiments of the present disclosure. However, the above-described concepts of the collision structure and the occlusion structure may also be illustrated mathematically, as shown in more detail below.

As explained above, present tracking techniques assume independence of individual target-measurement associations. Utilizing such an approach, measurements are assigned to tracks of a hypothesis without consideration of other tracks in the hypothesis and without taking into account measurements and tracks of other hypotheses (e.g., a parent hypothesis or other hypotheses for a current time interval). To illustrate this approach of independence assumption, let (labeled) RFS X be the global target state, and let Z be the global measurement. Then the filtering density $\pi$ is recursively obtained through set integrals:

$$\pi_k(X_k | Z_k) = \frac{g_k(Z_k | X_k) \pi_{(k|k-1)}(X_{k-1})}{\int g_k(Z_k | X) \pi_{k|k-1}(X) \delta X},$$

$$\pi_{k+1|k}(X_{k+1}) = \int f_{k+1|k}(X_{k+1} | X) \pi_k(X | Z_k) \delta X,$$

where f(•) is the motion transition, and g(•) is the measurement likelihood.

Given a set of measurements $Z=\{z_j, j=1, \ldots, |Z|\}$, a data association hypothesis $\theta$ for a labeled RFS X assigns to each label $\ell$ either a measurement index in a one-to-one fashion, or the special index 0 to denote a missed detection. Assuming conditional independence leads to the following factored form of the likelihood function:

$$g(Z | X) \propto \sum_{\theta: valid} \prod_{(x, \ell) \in X} \psi_Z^{(\theta(\ell))}(x, \ell), \qquad (1)$$

where $$\psi_Z^{(j)}(x, \ell) = \begin{cases} \frac{P_D(x, \ell) g(z_j | x, \ell)}{\kappa(z_j)}, & \text{if } j \in \{1, \ldots, |Z|\} \\ 1 - P_D(x, \ell), & \text{if } j = 0 \end{cases}, \qquad (2)$$

in which $\kappa$ (•) denotes clutter density, and $P_D$(•) probability of detection.

It can be seen from the above two equations that once the label $\ell$ is assigned the measurement $\theta(\ell)$, its likelihood of association is fixed; it "does not care" how other labels in the same hypothesis are assigned. The factored form of the likelihood function has two benefits:
1) Updating of the kinematic distribution of each track is carried out only with "its own" measurement; and
2) Taking the negative log, the "cost" of a hypothesis can be defined as a sum of selections from a cost matrix, whose entries are constructed independent of the hypotheses.

The second benefit leads to a ranking problem that can be efficiently solved using Murty's algorithm. However, it may be beneficial to utilize likelihood structures that consider the interactions among the tracks but still keep a factored form (first benefit). An efficient ranking algorithm for such structures that achieves the second benefit while retaining the first according to the concepts disclosed herein is provided below.

By introducing a factor $\lambda(X, \theta, \ell)$ for each track $(x, \ell)$ the likelihood function takes the form of:

$$g(Z|X) \propto \Sigma_{\theta: valid} \Pi_{(x, \ell) \in X} \lambda(X, \theta, \ell) \psi_Z^{(\theta(\ell))}(x, \ell), \qquad (3)$$

In this form, each track is made aware of "what's going on" with respect to other tracks within a given hypothesis, and adjust its own likelihood term accordingly. This accounts for not all but certain dependence among the tracks, while still maintaining a factored form so that the posterior distribution of each track is computed separately.

From Equation (3) above, a collision structure (or collision criterion) according to the present disclosure is defined. For example, a collision structure is defined as:

collide(X,$\theta$), which denotes a checking procedure that returns true if the hypothesis under consideration induces a collision among the tracks, such as hypothesis 730n of FIG. 7. In the collision structure above, the term $\psi_Z^{(\theta(\ell))}$ (x, $\ell$) is defined as in Equation (3) above, and the factor $\lambda(X, \theta, \ell)$ is defined as:

$$\lambda(X, \theta, \ell) = \begin{cases} 0, & \text{if collide } (X, \theta), \\ 1, & \text{otherwise.} \end{cases} \qquad (4)$$

Using such a collision structure, a hypothesis $\theta$ is evaluated and if a collision is found, the hypothesis may be dropped from further consideration. Otherwise, where a collision is not found, the likelihood for the hypothesis is the same as in the case when independence is assumed.

From Equation (3) above, an occlusion structure according to the present disclosure is also defined as:

$$\text{occluded}(X, \theta, \ell),$$

and which provides a checking procedure that returns true if track $\ell$ is occluded in this hypothesis.

For the occlusion structure, the term $\psi_Z^{(a(\ell))}(x, \ell)$ is modified as:

$$\psi_Z^{(j)}(x, \ell) = \begin{cases} \dfrac{P_D(x, \ell) g(z_j | x, \ell)}{\kappa(z_j)}, & \text{if } j \in \{1, \ldots, |Z|\}, \\ 1, & \text{if } j = 0 \end{cases} \quad (5)$$

The modification of $\psi_Z^{(j)}(x, \ell)$ allows tracks for which a missed detection occurs to be optimistically assumed to be under some occlusion. The factor $\lambda(X, \theta, \ell)$ from Equation (3) is then be defined as:

$$\lambda(X, \theta, \ell) = \begin{cases} 1 - P_D(x, \ell), & \text{if } j = 0 \text{ and not} \\ & \text{occluded}(X, \theta, \ell), \text{ or} \\ 1, & \text{otherwise}. \end{cases} \quad (6)$$

Using such an occlusion structure, when a hypothesis is evaluated, the "benefit of the doubt" previously given to a missed detection can now be verified. If it is not warranted, then the likelihood has to be reduced to the true value. Otherwise, the likelihood for the hypothesis is the same as in the case when independence is assumed and an oracle gives the correct probability of detection for missed detections.

As described above, the collision structure and/or the occlusion structure is utilized to provide a propose and verify algorithm that provides an efficient technique for ranking hypothesis, which may allow for a reduced number of hypotheses containing accurate information to be used to perform tracking. In an aspect, the propose and verify algorithm may limit the factor $\lambda(X, \theta, \ell)$ as follows:

$$0 \leq \lambda(X, \theta, \ell) \leq 1. \quad (7)$$

For the propose and verify algorithm, processing may include: 1) Set $\lambda(X, \theta, \ell) = 1$ and construct an iterator over the hypotheses in descending order of optimistic likelihoods. This means listing the hypotheses through lazy evaluation, such as using method calls has_next( ) and get_next( ) In an aspect, the iterator is constructed using Murty's algorithm. As a result, a set of candidate hypotheses is produced and ordered according to a proposed ranking, as described above with respect to the ranking criterion and as shown in the set of candidate hypotheses rankings 910 of FIG. 9 and the set of candidate hypotheses rankings 1010 of FIG. 10. 2) Evaluate each hypothesis and the values of $\lambda(X, \theta, \ell)$ are calculated. Each hypothesis is then inserted into a separate sorted list result in descending order of true likelihoods as shown in the ranked set of hypotheses 930 of FIG. 9 (e.g., for the collision structure) and the ranked set of hypotheses 1030 of FIG. 10 (e.g., for the occlusion structure). 3) Whenever $\Pi_{(x,\ell) \in X} \lambda(X, \theta, \ell) = 1$ happens, the true likelihood is the same as the optimistic likelihood, and therefore the ranking of this hypothesis and those before it in result is verified (because new entries can never go before it). 4) Stop when the desired number of top K hypotheses are obtained, or when no more hypotheses are available.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
   receiving, with at least one processor, sensor data associated with an environment that a vehicle is located in;
   obtaining, with the at least one processor, a set of candidate hypotheses based on the sensor data, wherein each candidate hypothesis of the set of candidate hypotheses corresponds to one or more tracks and wherein each candidate hypothesis is representative of a candidate location of one or more targets;
   evaluating, with the at least one processor, the set of candidate hypotheses against at least one criterion, wherein evaluating the set of candidate hypotheses against the at least one criterion comprises evaluating a predicted plausibility of a particular candidate hypothesis of the set of candidate hypotheses relative to a prior hypothesis with regard to a location of the one or more targets;
   ranking the set of candidate hypotheses, with the at least one processor, to generate a ranked set of hypotheses based on the evaluation of the set of candidate hypotheses against the at least one criterion, wherein the ranked set of hypotheses comprises a subset of hypotheses selected from among the set of candidate hypotheses based on the at least one criterion, and wherein ranking the set of candidate hypotheses to generate a ranked set of hypotheses comprises omitting from the ranked set of hypotheses at least one candidate hypothesis from the set of candidate hypotheses; and
   estimating, with the at least one processor, a location of each of the one or more targets based on the ranked set of hypotheses.

2. The method of claim 1, wherein the at least one criterion comprises a ranking criterion, and wherein ranking the set of candidate hypotheses further comprises:
   ranking the set of candidate hypotheses based on the ranking criterion.

3. The method of claim 2, wherein the at least one criterion comprises a collision criterion or an occlusion criterion, wherein the collision criterion is used to identify one or more candidate hypotheses representing a scenario where it is predicted to be unlikely that the one or more targets switch positions during a time interval without colliding, and wherein the occlusion criterion is used to identify one or more candidate hypotheses representing a scenario where one of the one or more targets is occluded by another one of the one or more targets.

4. The method of claim 3, wherein the at least one criterion comprises the collision criterion, and wherein evaluating the set of candidate hypotheses against the collision criterion comprises:
determining whether a collision condition is satisfied with respect to at least a portion of the set of candidate hypotheses; and
selectively including candidate hypotheses in the ranked set of hypotheses based on whether the collision condition is satisfied.

5. The method of claim 4, wherein the ranking criterion comprises a metric representative of a likelihood that a particular candidate hypothesis of the set of candidate hypotheses correctly identifies a location of the one or more targets without taking into account other candidate hypotheses of the set of candidate hypotheses, and wherein the collision criterion indicates whether the particular candidate hypothesis of the set of candidate hypotheses correctly identifies a location of the one or more targets taking into account at least one hypotheses from a previous time interval.

6. The method of claim 4, wherein candidate hypotheses that satisfy the collision condition are not included in the ranked set of hypotheses.

7. The method of claim 3, wherein the at least one criterion comprises the occlusion criterion, and wherein evaluating the set of candidate hypotheses against the occlusion criterion comprises:
determining, for each candidate hypotheses, whether an occlusion condition is satisfied with respect to any of the one or more targets; and
applying a penalty metric to candidate hypotheses that satisfy an occlusion condition, wherein the penalty metric reduces a ranking of the candidate hypotheses that satisfy the occlusion condition.

8. The method of claim 7, wherein the ranking criterion comprises a metric representative of a likelihood that at least one target of the one or more targets associated with a particular candidate hypothesis of the set of candidate hypotheses is occluded without taking into account other candidate hypotheses of the set of candidate hypotheses, and wherein the occlusion criterion indicates whether the at least one target associated with the particular candidate hypothesis is occluded taking into account at least one hypotheses from a previous time interval, wherein the occlusion condition is satisfied upon detection of an occlusion based on the ranking criterion but not the occlusion criterion.

9. The method of claim 8, further comprising:
determining whether the particular candidate hypothesis is associated with a missed detection based on the occlusion criterion, wherein the penalty metric is not applied to candidate hypotheses associated with missed detections.

10. The method of claim 3, wherein the at least one criterion comprises both the collision criterion and the occlusion criterion.

11. The method of claim 1, wherein the sensor data is obtained from a sensor comprising at least one of a LIDAR sensor, a camera, or a microscope.

12. The method of claim 1, wherein the one or more targets comprise at least one of vehicles, cells, people, robots, or animals.

13. A system comprising:
at least one processor; and
at least one non-transitory storage media storing instructions that, when executed by the at least one processor, cause the at least one processor to:
receive sensor data associated with an environment that a vehicle is located in;
a set of candidate hypotheses based on the sensor data, wherein each candidate hypothesis of the set of candidate hypotheses corresponds to one or more tracks and wherein each candidate hypothesis is representative of a candidate location of one or more targets;
evaluate the set of candidate hypotheses against at least one criterion, wherein to evaluate the set of candidate hypotheses against the at least one criterion, the instructions, when executed by the at least one processor, cause the at least one processor to evaluate a predicted plausibility of a particular candidate hypothesis of the set of candidate hypotheses relative to a prior hypothesis with regard to a location of the one or more targets;
rank the set of candidate hypotheses to generate a ranked set of hypotheses based on the evaluation of the set of candidate hypotheses against the at least one criterion, wherein the ranked set of hypotheses comprises a subset of hypotheses selected from among the set of candidate hypotheses based on the at least one criterion, and wherein to rank the set of candidate hypotheses to generate the ranked set of hypotheses, the instructions, when executed by the at least one processor, cause the at least one processor to omit from the ranked set of hypotheses at least one candidate hypothesis from the set of candidate hypotheses; and
estimate a location of each of the one or more targets based on the ranked set of hypotheses.

14. The system of claim 13, wherein the at least one criterion comprises a ranking criterion, and wherein to evaluate the set of candidate hypotheses against the at least one criterion, the instructions, when executed by the at least one processor, cause the at least one processor to:
rank the set of candidate hypotheses based on the ranking criterion, wherein the ranking criterion comprises a metric representative of a likelihood that a particular candidate hypothesis of the set of candidate hypotheses correctly identifies a location of the one or more targets without taking into account other candidate hypotheses of the set of candidate hypotheses.

15. The system of claim 14, wherein the at least one criterion comprises a collision criterion that indicates whether a particular candidate hypothesis of the set of candidate hypotheses correctly identifies a location of the one or more targets taking into account at least one hypotheses from a previous time interval, and wherein to evaluate of the set of candidate hypotheses against the collision criterion, the instructions, when executed by the at least one processor, cause the at least one processor to:
determine whether a collision condition is satisfied with respect to at least a portion of the set of candidate hypotheses; and
selectively include candidate hypotheses in the ranked set of hypotheses based on whether the collision condition is satisfied, wherein candidate hypotheses that satisfy the collision condition are not included in the ranked set of hypotheses.

16. The system of claim 14, wherein the at least one criterion comprises an occlusion criterion, wherein the occlusion criterion is used to identify one or more candidate hypotheses representing a scenario where one of the one or more targets is occluded by another one of the one or more targets, and wherein to evaluate the set of candidate hypotheses against the occlusion criterion, the instructions, when executed by the at least one processor, cause the at least one processor to:
  determine, for each candidate hypotheses, whether an occlusion condition is satisfied with respect to any of the one or more targets, wherein the occlusion condition is satisfied upon detection of an occlusion based on the ranking criterion but not the occlusion criterion; and
  apply a penalty metric to candidate hypotheses that satisfy the occlusion condition, wherein the penalty metric reduces a ranking of the candidate hypotheses that satisfy the occlusion condition.

17. At least one non-transitory computer-readable storage medium storing instructions that, when executed by one or more processors, cause the one or more processors to perform operations for multi-target tracking, the operations comprising:
  receiving sensor data associated with an environment that a vehicle is located in;
  obtaining a set of candidate hypotheses based on the sensor data, wherein each candidate hypothesis of the set of candidate hypotheses corresponds to a one or more tracks and wherein each candidate hypothesis is representative of a candidate location of one or more targets;
  evaluating the set of candidate hypotheses against at least one criterion, wherein evaluating the set of candidate hypotheses against the at least one criterion comprises evaluating a predicted plausibility of a particular candidate hypothesis of the set of candidate hypotheses relative to a prior hypothesis with regard to a location of the one or more targets;
  ranking the set of candidate hypotheses to generate a ranked set of hypotheses based on the evaluation of the set of candidate hypotheses against the at least one criterion, wherein the ranked set of hypotheses comprises a subset of hypotheses selected from among the set of candidate hypotheses based on the at least one criterion, and wherein ranking the set of candidate hypotheses to generate a ranked set of hypotheses comprises omitting from the ranked set of hypotheses at least one candidate hypothesis from the set of candidate hypotheses; and
  estimating a location of each of the one or more targets based on the ranked set of hypotheses.

18. The at least one non-transitory computer-readable storage medium of claim 17, the operations further comprising:
  determining one or more navigation operations based on the location of each of the one or more targets; and
  controlling navigation of the vehicle based at least in part on the one or more navigation operations.

19. The at least one non-transitory computer-readable storage medium of claim 18, wherein the at least one criterion comprises a collision criterion, and wherein evaluating the set of candidate hypotheses against the collision criterion comprises:
  determining whether a collision condition is satisfied with respect to at least a portion of the set of candidate hypotheses based on an independence criterion; and
  selectively including candidate hypotheses in the ranked set of hypotheses based on whether the collision condition is satisfied, wherein the collision criterion indicates whether the particular candidate hypothesis of the set of candidate hypotheses correctly identifies a location of the one or more targets taking into account at least one hypotheses from a previous time interval.

20. The at least one non-transitory computer-readable storage medium of claim 18, wherein the at least one criterion comprises an occlusion criterion, and wherein evaluating the set of candidate hypotheses against the occlusion criterion comprises:
  determining, for each candidate hypotheses, whether an occlusion condition is satisfied with respect to any of the one or more targets based on an initial ranking of the set of candidate hypotheses, the initial ranking of the set of candidate hypotheses determined without taking into account other candidate hypotheses of the set of candidate hypotheses; and
  applying a penalty metric to candidate hypotheses determined to satisfy the occlusion condition without taking into account other candidate hypotheses of the set of candidate hypotheses but to not satisfy the occlusion condition based on the occlusion criterion.

* * * * *

UNITED STATES PATENT AND TRADEMARK OFFICE
CERTIFICATE OF CORRECTION

PATENT NO. : 12,282,866 B2
APPLICATION NO. : 17/324960
DATED : April 22, 2025
INVENTOR(S) : Lingji Chen Page 1 of 1

It is certified that error appears in the above-identified patent and that said Letters Patent is hereby corrected as shown below:

In the Specification

In Column 9, Line 26, delete "predetermined spectrum In" and insert --predetermined spectrum. In--.

In Column 35, Line 48 (Approx.), delete "get_next( ) In" and insert --get_next( ). In--.

In the Claims

In Column 39, Claim 17, Line 22 (Approx.), delete "corresponds to a one" and insert --corresponds to one--.

Signed and Sealed this
Twenty-second Day of July, 2025

Coke Morgan Stewart
*Acting Director of the United States Patent and Trademark Office*